US009794334B2

(12) United States Patent
Wong et al.

(10) Patent No.: US 9,794,334 B2
(45) Date of Patent: *Oct. 17, 2017

(54) SYSTEMS AND METHODS TO PROCESS A REQUEST RECEIVED AT AN APPLICATION PROGRAM INTERFACE

(71) Applicant: PayPal Inc., San Jose, CA (US)

(72) Inventors: Laura Wong, San Jose, CA (US); Srikala Munamala, Cupertino, CA (US); Sergiy Pereshyvaylo, San Jose, CA (US); Hemant Tamhankar, Milpitas, CA (US); Ping Zou, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/683,048

(22) Filed: Apr. 9, 2015

(65) Prior Publication Data
US 2015/0215397 A1 Jul. 30, 2015

Related U.S. Application Data

(63) Continuation of application No. 12/576,097, filed on Oct. 8, 2009, now Pat. No. 9,043,401.

(51) Int. Cl.
G06F 15/16 (2006.01)
H04L 29/08 (2006.01)
(Continued)

(52) U.S. Cl.
CPC .......... *H04L 67/1091* (2013.01); *G06F 9/505* (2013.01); *H04L 67/1078* (2013.01); *H04L 67/42* (2013.01); *G06F 2209/5017* (2013.01)

(58) Field of Classification Search
CPC ............ G06F 2209/5017; G06F 9/505; H04L 67/1091
See application file for complete search history.

(56) References Cited

U.S. PATENT DOCUMENTS 7,650,331 B1 1/2010 Dean et al.
9,043,401 B2 5/2015 Wong et al.
(Continued)

FOREIGN PATENT DOCUMENTS

CN 101072133 A 11/2007
CN 102783129 A 11/2012
(Continued)

OTHER PUBLICATIONS

"U.S. Appl. No. 12/576,097, Advisory Action mailed Feb. 14, 2013", 3 pgs.
(Continued)

Primary Examiner — June Sison
(74) Attorney, Agent, or Firm — Maschoff Brennan

(57) ABSTRACT

Methods and systems to process a request received at an application program interface are described. The system receives a request from a client machine that includes a job that is associated with data. The request is received at an application program interface. Next, a peer-to-peer network of processing nodes generates a plurality of sub-jobs based on the job. The peer-to-peer network of processing nodes schedules the plurality of sub-jobs for parallel processing based on an availability of resources that are respectively utilized by the sub-jobs and parallel processes the plurality of sub-jobs before generating task results that are respectively associated with the plurality of sub-jobs.

20 Claims, 20 Drawing Sheets

(51) Int. Cl.
*G06F 9/50* (2006.01)
*H04L 29/06* (2006.01)

(56) References Cited

U.S. PATENT DOCUMENTS

| | | | |
|---|---|---|---|
| 2005/0223114 A1* | 10/2005 | Hanson | H04L 41/0893 709/245 |
| 2006/0123010 A1 | 6/2006 | Landry et al. | |
| 2007/0005410 A1* | 1/2007 | Kasravi | G06F 9/466 719/318 |
| 2007/0143827 A1 | 6/2007 | Nicodemus et al. | |
| 2007/0276747 A1 | 11/2007 | Campbell | |
| 2008/0027854 A1 | 1/2008 | Backer | |
| 2008/0077931 A1 | 3/2008 | Ono | |
| 2008/0172429 A1 | 7/2008 | Lin et al. | |
| 2009/0109959 A1 | 4/2009 | Elliott et al. | |
| 2009/0172301 A1 | 7/2009 | Ebersole et al. | |
| 2009/0240547 A1* | 9/2009 | Fellenstein | G06Q 40/04 705/7.23 |
| 2010/0153950 A1 | 6/2010 | Govindankutty et al. | |
| 2010/0318559 A1 | 12/2010 | Yan et al. | |
| 2010/0318674 A1 | 12/2010 | Mond et al. | |
| 2011/0087731 A1 | 4/2011 | Wong et al. | |
| 2012/0137004 A1 | 5/2012 | Smith et al. | |
| 2014/0040411 A1 | 2/2014 | Weber et al. | |

FOREIGN PATENT DOCUMENTS

| | | |
|---|---|---|
| JP | 2009151645 A | 7/2009 |
| KR | 101422372 B1 | 7/2014 |
| WO | WO-2011043883 A1 | 4/2011 |

OTHER PUBLICATIONS

"U.S. Appl. No. 12/576,097, Examiner Interview Summary Dec. 2, 2014", 5 pgs.
"U.S. Appl. No. 12/576,097, Examiner Interview Summary mailed Jul. 3, 2013", 3 pgs.
"U.S. Appl. No. 12/576,097, Final Office Action mailed Dec. 5, 2012", 32 pgs.
"U.S. Appl. No. 12/576,097, Non Final Office Action mailed Jun. 28, 2012", 25 pgs.
"U.S. Appl. No. 12/576,097, Non Final Office Action mailed Jul. 9, 2014", 23 pgs.
"U.S. Appl. No. 12/576,097, Notice of Allowance mailed Jan. 9, 2015", 13 pgs.
"U.S. Appl. No. 12/576,097, Response filed Feb. 5, 2013 to Final Office Action mailed Dec. 5, 2012", 17 pgs.
"U.S. Appl. No. 12/576,097, Response filed Sep. 28, 2012 to Non-Final Office Action mailed Jun. 28, 2012", 16 pgs.
"U.S. Appl. No. 12/576,097, Response filed Dec. 9, 2014 to Non Final Office Action mailed Jul. 9, 2014", 17 pgs.
"Chinese Application Serial No. 201080056110.X, Office Action mailed Mar. 3, 2014", with English translation of claims, 28 pgs.
"Chinese Application Serial No. 201080056110.X, Response filed Sep. 18, 2014", with English translation of claims, 15 pgs.
"European Application Serial No. 10822397.5, Extended European Search Report mailed Apr. 9, 2015", 7 pgs.
"European Application Serial No. 10822397.5, Office Action mailed May 23, 2012", 2 pgs.
"European Application Serial No. 10822397.5, Response filed Aug. 31, 2012 to Office Action mailed May 23, 2012", 12 pgs.
"International Application Serial No. PCT/US10/047569, International Search Report mailed Oct. 25, 2010", 2 pgs.
"International Application Serial No. PCT/US10/047569, Written Opinion mailed Oct. 25, 2010", 6 pgs.
"International Application Serial No. PCT/US2010/047569, International Preliminary Report on Patentability mailed Apr. 19, 2012", 8 pgs.
"JPPF Homepage", © 2005-2011 JPPF.org, [online]. © 2005-2011 JPPF.org. Retrieved from the Internet: <URL: http://www.jppf.org/index.php.>, (2012), 1 pg.
"Korean Application Serial No. 20127011931, Notice of Allowance mailed Jun. 24, 2014", with English translation, 3 pgs.
"Korean Application Serial No. 20127011931, Office Action mailed Jul. 25, 2013", with English translation of claims, 8 pgs.
"Korean Application Serial No. 20127011931, Response filed Sep. 25, 2013", with English translation of claims, 26 pgs.
"Russian Application Serial No. 2012116596, Office Action mailed Jul. 24, 2013", with English translation of claims, 9 pgs.
"Russian Application Serial No. 2012116596, Response filed Jan. 21, 2014 to Office Action mailed Jul. 24, 2013", with English translation of claims, 15 pgs.
"Welcome to Apache™ Hadoop™!", © 2011 The Apache Software Foundation., [online]. © 2011 The Apache Software Foundation. Retrieved from the Internet:, (Feb. 22, 2012), 1 pg.
Buyya, Rajkumar, et al., "Economic models for resource management and scheduling in Grid computing", Concurrency Computat.: Pract. Exper., 14, (2002), 1507-1542.

* cited by examiner

FIG.4

| TIME INFORMATION (E.G., HOUR OF THE DAY) | MAXIMUM UTILIZATION (E.G., MAXIMUM REMOTE RESOURCES) |
|---|---|
| 0 | 10 |
| 1 | 10 |
| 2 | 10 |
| 3 | 10 |
| 4 | 10 |
| 5 | 9 |
| 6 | 8 |
| 7 | 7 |
| 8 | 5 |
| 9 | 7 |
| 10 | 8 |
| 11 | 9 |
| . | . |
| 23 | 23 |

MAXIMUM UTILIZATION INFORMATION 113

115  117

PEAK USAGE BY OTHER PROCESSES

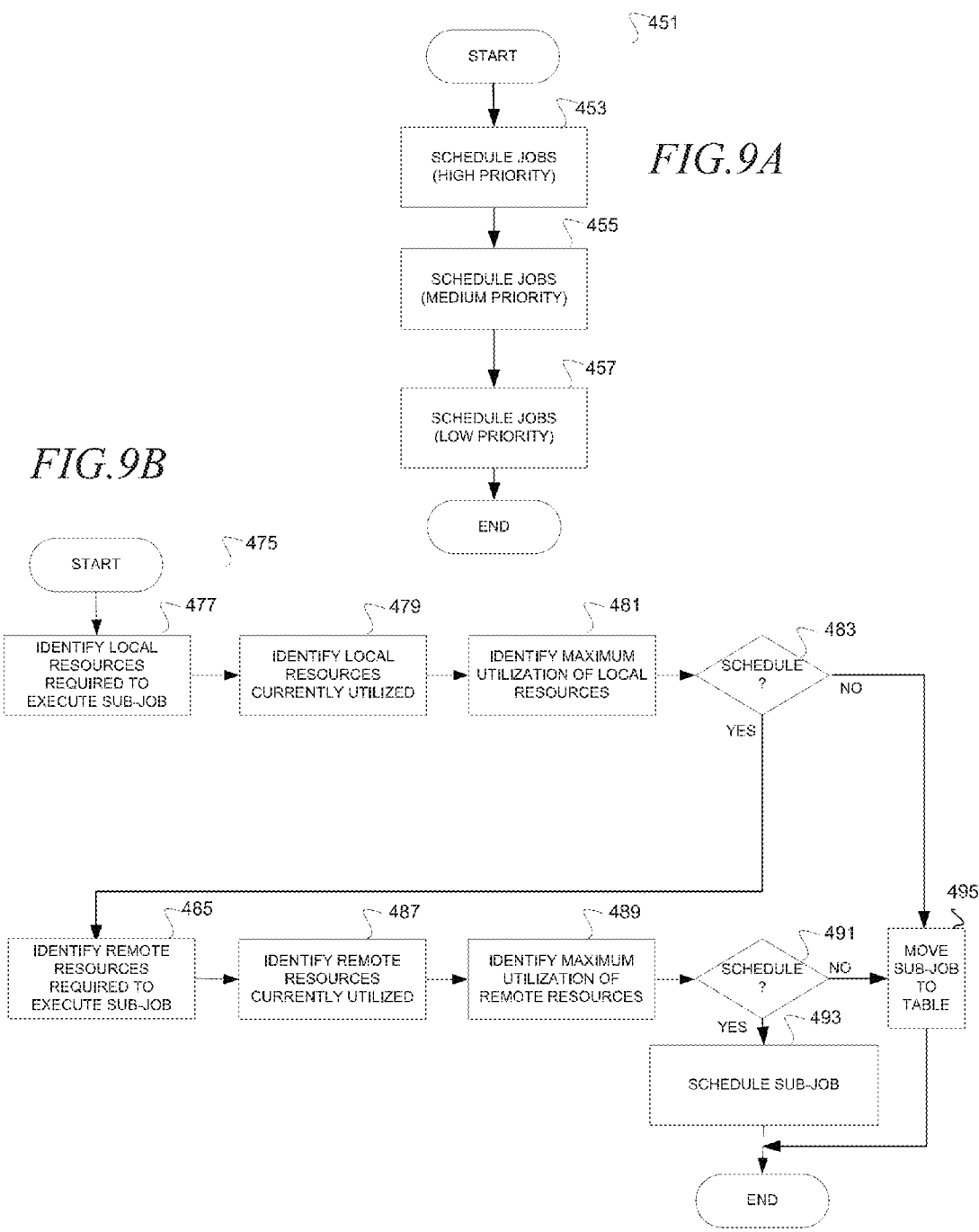

Please Select

| Job Module | Job Type: | | Priority: | State: | | Creation | Creation |
|---|---|---|---|---|---|---|---|
| BDX | --All-- | | High | Completed | | ⊙ Duration: | ○ Date: |
| | | | | | | 30 Minutes | |

Submit 6 rows in total

BDX Job Module - Aggregate Job Statistics

| Job Type | Priority | State | Job Count | Recurring Job Count | Task Count | | | Time Spent (s) | | | SLO (s) | | |
|---|---|---|---|---|---|---|---|---|---|---|---|---|---|
| | | | | | Total | Success | Finished | Min | Max | Avg | Min | Max | Avg |
| ReviseInventoryStatus | High | Completed | 1 | 0 | 2 | 2 | 2 | 91 | 91 | 91 | 0 | 0 | 0 |
| OrderAck | High | Completed | 2 | 0 | 10 | 10 | 10 | 192 | 202 | 197 | 0 | 0 | 0 |
| EndFixedPriceItem | High | Completed | 1 | 0 | 1946 | 1946 | 1946 | 162 | 162 | 162 | 0 | 0 | 0 |
| AddFixedPriceItem | High | Completed | 1 | 0 | 9 | 9 | 9 | 113 | 113 | 113 | 0 | 0 | 0 |
| ReviseFixedPriceItem | High | Completed | 1 | 0 | 211 | 211 | 211 | 156 | 156 | 156 | 0 | 0 | 0 |
| SetShipmentTrackingInfo | High | Completed | 2 | 0 | 18 | 18 | 18 | 117 | 218 | 167 | 0 | 0 | 0 |

| Resource | Action | State | ReasonCode | Task Count | Response Times(Seconds) | | |
|---|---|---|---|---|---|---|---|
| | | | | | Avg | Max | Min |
| SearchQBCore | ActiveInventoryReport_core | Completed | | 1 | 375.00 | 375 | 375 |
| vSapsCore | AddFixedPriceItem_core | Completed | | 34 | 380.15 | 985 | 149 |
| vSapsCore | AddItem_core | Failed | FakeBid | 3 | 401.00 | 953 | 94 |
| vSapsCore | AddItem_core | ErrorRetry | | 1 | 36790.00 | 36790 | 36790 |
| vSapsCore | AddItem_core | Completed | | 52893 | 1457.55 | 31031 | 125 |
| vSapsJnl | AddItem_jnl | Completed | | 7448 | 1749.72 | 10698 | 172 |
| vSapsCore | AddToWatchlist_core | Completed | | 55 | 36912.16 | 85437 | 1812 |
| vSapsCore | CompleteSale_core | Completed | | 38 | 1652.39 | 9466 | 360 |
| vSapsCore | EndFixedPriceItem_core | Completed | | 460 | 234.59 | 2467 | 109 |
| vSapsCore | EndItem_core | Completed | | 19971 | 532.70 | 35200 | 110 |
| vSapsCore | EndItem_core | ErrorRetry | | 2 | 351.50 | 453 | 250 |

SYSTEMS AND METHODS TO PROCESS A REQUEST RECEIVED AT AN APPLICATION PROGRAM INTERFACE

RELATED APPLICATION

This application is a continuation of U.S. patent application Ser. No. 12/576,097, filed on Oct. 8, 2009, the benefit of priority of which is claimed hereby, and which is incorporated herein by reference in its entirety.

TECHNICAL FIELD

This disclosure relates to the technical field of data communications. More particularly, systems and methods to process a request received at an application program interface are described.

RELATED ART

A system may include an application programming interface that is utilized to receive a request from a client machine. The request may include a job that prompts the system to communicate data to the client machine. Yet another request may include a job that prompts the system to retrieve data from the client machine. In some instances the quantity of data may be so large that the time to complete the job may be prohibitive.

BRIEF DESCRIPTION OF THE DRAWINGS

Embodiments illustrated by way of example and not limitation in the figures of the accompanying drawings, in which:

FIG. 4 is a block diagram illustrating maximum utilization information, according to an embodiment;

FIG. 9A is a flow chart illustrating a method, according to an embodiment, to schedule sub-jobs of different priorities for parallel processing;

FIG. 9B is a flow chart illustrating a method, according to an embodiment, to schedule sub-jobs of the same priority for parallel processing;

FIGS. 11-19 are diagrams illustrating various interfaces, according to an embodiment.

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to process a request received at an application program interface are provided. Various embodiments are described below in connection with the figures provided herein.

Figure 1:
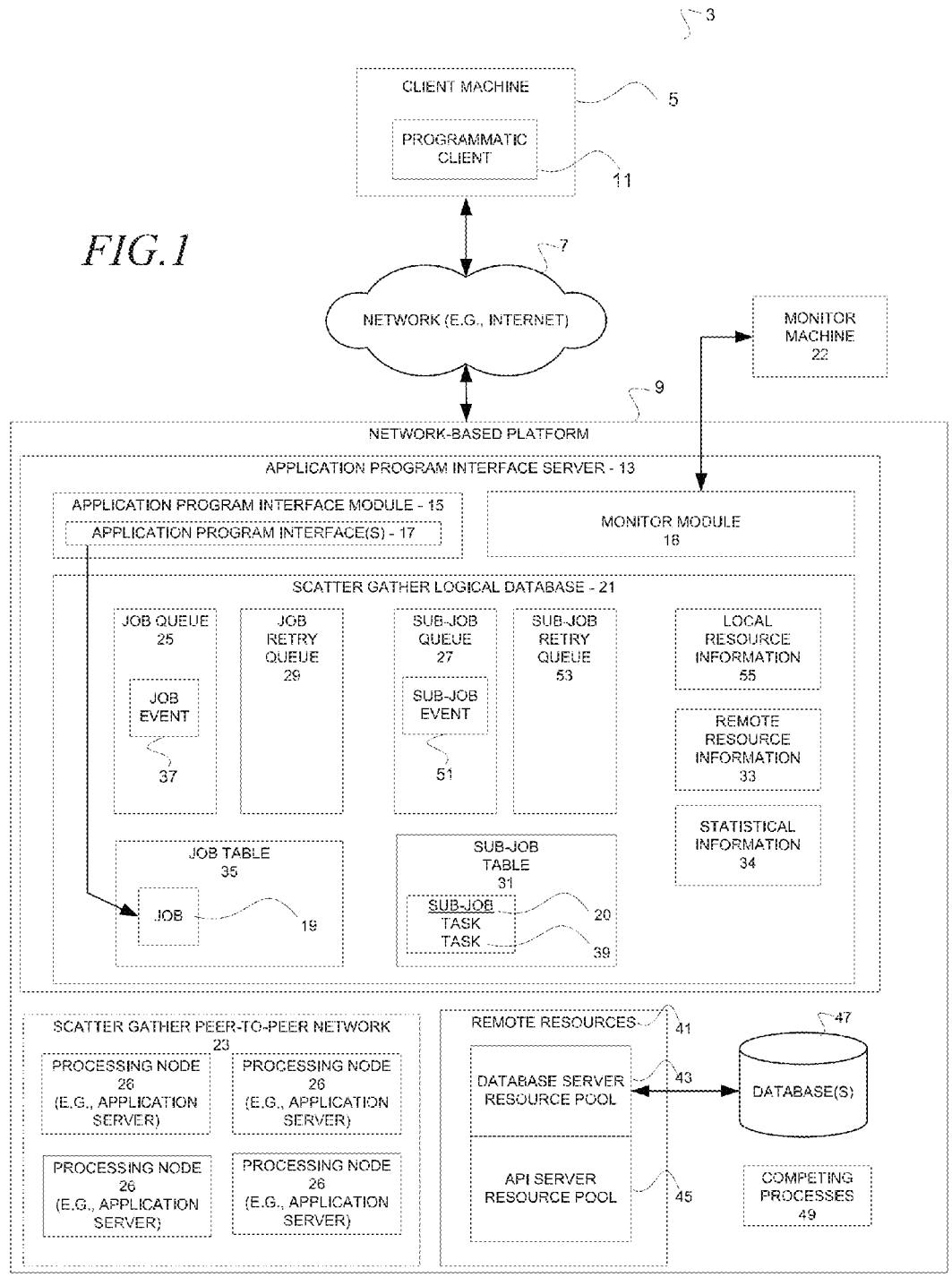
FIG. 1 is a block diagram illustrating a system, according to an embodiment, to process a request received at an application program interface.

FIG. 1 is a block diagram illustrating a system 3, according to an embodiment, to process a request received at an application program interface. The system 3 is shown to include a client machine 5 that includes a programmatic client 11 that generates a request and communicates the request over a network 7 to a network-based platform 9. The network-based platform 9 may, in turn, include an application program interface server 13 that includes an application program interface module 15, which includes an application program interface 17 (API) that receives the request. For example, the API 17 that receives the request may include a set of routines, data, data structures, object classes and/or protocols provided by libraries and/or operating systems that are utilized to receive and respond to the request. The request may specify a job 19 that requires the retrieval of data from the client machine 5. In another example, the job 19 may require the communication of data from the network-based platform 9 to the client machine 5. Further, in one embodiment, the data may be partitioned into individual portions that may be parallel processed.

Broadly speaking, the application program interface module 15 may asynchronously process the request by storing the job 19 in a scatter gather logical database 21 for parallel processing by a scatter gather peer-to-peer network 23. For example, the scatter gather peer-to-peer network 23 may scatter the job 19 by generating sub-jobs 20 based on the job 19, schedule the sub-jobs 20 for processing based on an availability of local and remote resources, independently parallel process the sub-jobs 20 to completion, gather the job-results from each sub-job 20, and communicate the results of the job 19 to the client machine 5. Accordingly, a request may include a job 19 that is directed at large data sets. Such a job 19 may be scattered into sub-jobs 20 for parallel processing by a peer-to-peer network 23 that optimally utilizes local and remote resources before asynchronously responding to the request.

The application program interface server 13 may further include a monitor module 18 for collecting, storing, accessing and reporting job 19 and sub-job 20 statistics. The monitor module 18 may be utilized by a monitor machine 22 that communicates commands and receives statistical and trace information in the form of user interfaces and reports.

Scatter Gather Logical Database

The scatter gather logical database 21 includes a job table 35, a job queue 25, a job retry queue 29, a sub-job table 31, a sub-job queue 27, a sub-job retry queue 53, local resource information 55, remote resource information 33, and statistical information 34.

Jobs

The job-table 35 may be used to initially store a job 19 that is received in a request. Further in response to receiving the request, a job event 37 may be generated for the job 19 and stored on the job queue 25. The job event 37 may cause the scatter gather peer-to-peer network 23 to process the job 19. For example, the job event 37 may be retrieved by the scatter gather peer-to peer network 23 and the corresponding job 19 may be processed for a predetermined period of time after which the job event 37 is stored on the job retry queue 29 with an associated time-out. Responsive to expiration of the timeout, the job 19 may again be retrieved by the scatter gather peer-to peer network 23 for further processing. Accordingly, the job event 37 may be repetitively retrieved from the job retry queue 29, processed, and stored back on the job retry queue 29 until the job 19 is completed. The scatter gather peer-to-peer network 23 may process the job 19 to generate sub-jobs 20 that are stored in the sub-job table 31. For example, the scatter gather peer-to-peer network 23 may process a particular job 19 to generate twenty sub-jobs 20 that are stored in the sub-job table 31. The scatter gather peer-to-peer network 23 may further schedule a sub-job event 51 on the sub-job queue 27 in response to identifying remote resources that are available for the corresponding sub-job 20.

Sub-Jobs

Sub-jobs 20 may be parallel processed by the scatter gather peer-to-peer network 23. Sub-jobs 20 may respectively correspond to sub-job events 51 that are stored on the sub-job queue 27. The sub-job event 51 may be retrieved from the sub-job queue 27 and the corresponding sub-job 20 may be initially processed by the scatter gather peer-to peer network 23 until completion or until the sub-job 20 is interrupted causing the sub-job event 51 to be stored on the sub-job retry queue 53 with an associated time-out. Responsive to expiration of the timeout, the sub-job event 51 may be retrieved by scatter gather peer-to peer network 23 for further processing. Accordingly, the sub-job event 51 may be repeatedly retrieved from the sub-job retry queue 53, processed, and stored back on the sub-job retry queue 53 until the corresponding sub-job 20 is completed. Each sub-job 20 may include one or more tasks 39 that specify operations to be performed, as described further below.

Scatter Gather Peer to Peer Network

The scatter gather peer-to-peer network 23 may include multiple processing nodes 26 that respectively utilize the scatter gather logical database 21 to process jobs 19 and sub-jobs 20. Accordingly, the processing power and storage capacity of the scatter gather peer-to-peer network 23 may be scaled by adding processing nodes 26 or diminished by removing processing nodes 26.

The processing node(s) 26, as described above, may initially process a job 19 by scattering the job 19 into sub-jobs 20. For example, the processing node 26 may generate sub-jobs 20 based on the job 19, store the sub-jobs 20 in the sub-job table 31, and store a sub-job event 51 in the sub-job queue 27. The sub-jobs may include tasks 39. Typically the tasks 39 include instructions that may be executed to process a portion of the data partitioned to the sub-job 20. Next, the processing node 26 may identify whether one or more sub-jobs 20 may be scheduled for execution. The processing node 26 may schedule one or more sub-jobs 20 for execution based on the availability of local and remote resources 41, as respectively utilized by the sub-jobs 20. For example, the processing node 26 may move a sub-job event 51 to the sub-job retry queue 53 in response to identifying available local and remote resources 41. Movement onto the sub-job retry queue 53 makes the corresponding sub-job 20 visible to other processing nodes 26 in the scatter gather peer-to-peer network 23. Accordingly, a processing node 26 in the scatter gather peer-to-peer network 23 may subsequently identify the sub-job event 51 on the sub-job retry queue 53 and process the sub-job 20. Conversely, the sub-jobs 20 may not be scheduled for execution because local and remote resources 41 are not available. In such a case, the processing node 26 may wait until sufficient resources are available to schedule the sub-job 20 for execution.

In one embodiment the processing nodes 26 may utilize local resource information 55 to identify whether local resources are available to process the sub-jobs 20. For example, the local resources may include memory and processors associated with a pool of processing nodes 26. In one embodiment the local resources for a pool of processing nodes 26 may be normalized into a single value, as described further below. Accordingly, a particular processing node 26 may identify whether sufficient local resources are available in its pool before processing a sub-job 20.

In one embodiment the processing nodes 26 may utilize remote resource information 33 to identify whether remote resources 41 are available to process sub-jobs 20. In one embodiment, the remote resources 41 may include a database server resource pool 43 and an API server resource pool 45. The database server resource pool 43 may include multiple database servers that provide access to databases 47. The API server resource pool 45 may include multiple API servers that provide network access to the client machine 5 and other machines.

Other Components

The statistical information 34 may be used to store statistical data, raw data, tracing data, and other types of data to facilitate the management of jobs 19 and sub-jobs 20.

The competing processes 49 may compete with the scatter gather peer-to-peer network 23 for allocation of the remote resources 41. In one embodiment, the scatter gather peer-to-peer network 23 may be throttled back to limit the use of the remote resources 41 based on the anticipated or actual utilization of the remote resources 41 by the competing processes 49. For example, the competing processes 49 may exhibit a maximum (e.g., peak) and minimum utilization of the remote resources 41 over a period of time. The scatter gather peer-to-peer network 23 may be throttled back to limit the use of the remote resources 41 during peak utilization of the remote resources 41 by the competing processes 49. Conversely, the scatter gather peer-to-peer network 23 may not be throttled back to limit the use of the remote resources 41 during low or minimum utilization of the remote resources 41 by the competing processes 49.

In one embodiment the processing nodes 26 in the scatter gather peer-to-peer network 23 may utilize a retry mechanism to access a remote resource 41. Accordingly, the processing nodes 26 may distinguish between a recoverable error and a non-recoverable error. In the event of identifying a recoverable error, the processing node 26 may retry accessing the remote resource 41 (e.g., database, application programming interface). In the event of identifying a non-recoverable error, the processing node 26 may register the job as failed.

It will be appreciated by one having ordinary skill in the art that the processing of a job 19 may span multiple processing nodes 26 at different times. To facilitate diagnosing failures and tracing the operation of the multiple processing nodes 26, the monitor module 18 may be utilized to centrally collect and display such information and to further generate user interfaces including such information that are viewable at the monitor machine 22. The user interfaces may include selectable user interface elements that may be utilized to drill down from a job 19 to sub-jobs 20, from a sub-job 20 to tasks 39, from a task 39 to a machine (e.g., processing node 26)/thread that worked on the task 39, and from the processing node 26 that worked on the task 39 to a log that may include log events that chronicle the execution of the task 39.

Figure 2A:
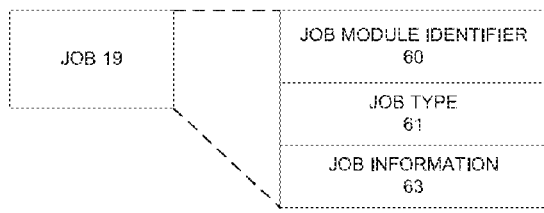
FIG. 2A is a block diagram illustrating a job, according to an embodiment.

FIG. 2A is a block diagram illustrating a job 19, according to an embodiment. The job 19 includes a job module identifier 60, a job type 61 and job information 63. The job module identifier 60 may be used to identify a job module, as described later. The job type 61 may be used to identify the type of job 19. For example, the network-based platform 9 may have the ability to process different types of jobs 19 for the same job module identifier 60. The job information 63 may be used to identify the author of the job 19, the functions to be performed, the priority of the job 19, the type and quantity of local and remote resources utilized by the job 19 and associated sub-jobs 20, the network address of the data, the type of data, the quantity of data and other information utilized by the job 19.

Figure 2B:
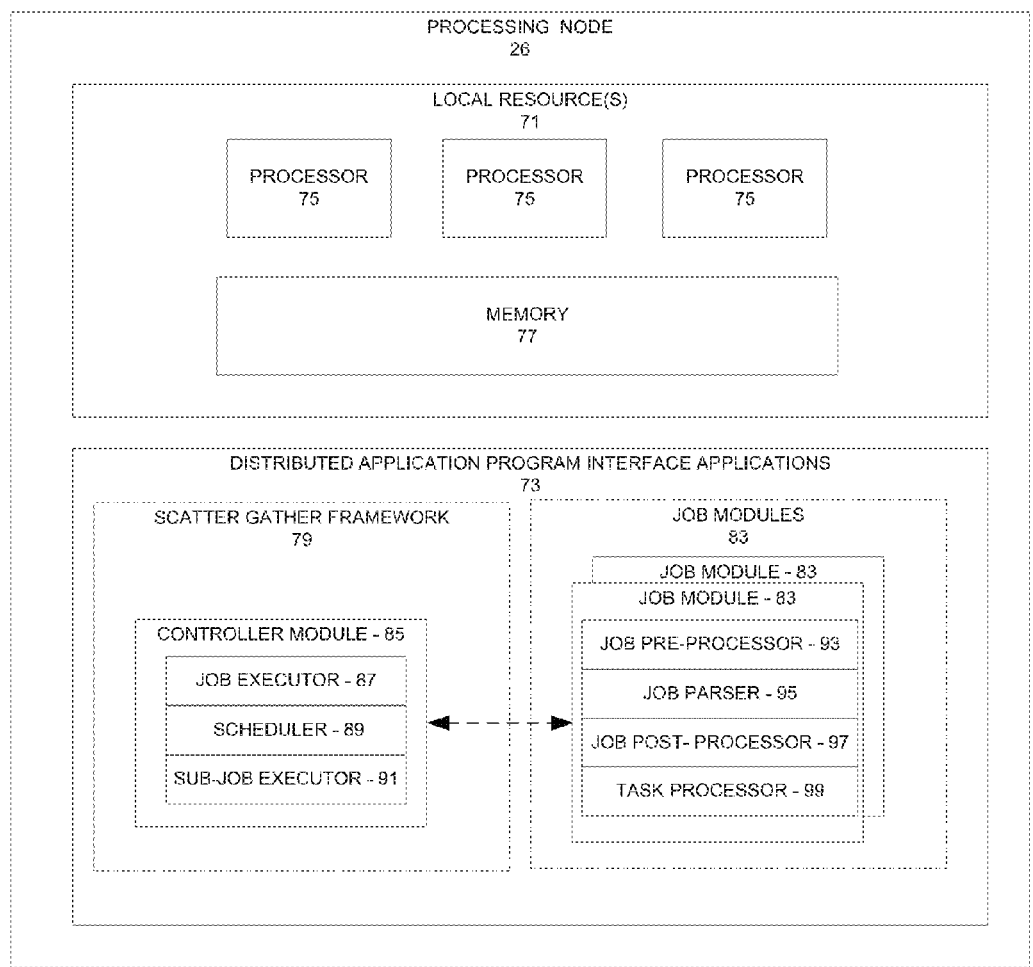
FIG. 2B is a block diagram illustrating a processing node, according to an embodiment.

FIG. 2B is a block diagram illustrating a processing node 26, according to an embodiment. The processing node 26 may include local resources 71 and distributed application program interface applications 73 (e.g., modules). The local resources 71 are shown to include three processors 75. Other embodiments may include additional or fewer processors 75. The local resources 71 are further shown to include a memory 77 of a specific quantum that may be increased or decreased. Other embodiments may include additional or less memory.

The distributed application program interface applications 73 include a scatter gather framework 79 (e.g., modules) and job modules 83. Each job module 83 corresponds to an application program interface 17 in the application program interface module 15 (not shown) and a job-module identifier 60 in the job 19. Accordingly, the processing nodes 26 in the scatter gather framework 79 may be equipped to process a new job 19 by adding a job-module 83 to the distributed application program interface applications 73 and by adding an application program interface 17 to the application program interface module 15 (not shown). The scatter gather framework 79 may utilize the job identifier 60 in the job 19 to invoke the appropriate job module 83 to process the job 19. Accordingly, the functions that may be performed by the scatter gather framework 79 remain constant for all jobs 19. In contrast, the functions that may be performed by the appropriate job module 83 are specific to the job 19 and the corresponding application program interface 17.

The scatter gather framework 79 may include a controller module 85. The controller module 85 may include components in the form of a job executor 87, a scheduler 89, and a sub-job executor 91. The controller module 85 and its components may invoke components of the job module 83 to process the job 19. The job module 83 includes components in the form of a job pre-processor 93, a job parser 95, a job post-processor 97 and a task processor 99.

The controller module 85 may coordinate the interaction with other modules that execute in the processing node 28 and identify whether local resources on the processing node 26 are available to process jobs 19. For example, the controller module 85 may identify whether an adequate number of processors 75 and memory 77 are available on the processing node 26.

The job executor 87 may invoke the appropriate job pre-processor 93 based on the job module identifier 60 in the job 19. The job pre-processor 93 may perform pre-processing activities to prepare the job 19 for further processing. For example, the job pre-processor 93 may calculate the priority of the job 19. In one embodiment, the priority of the job 19 may be high, medium, or low. Further, the job pre-processor 93 may extract the name of a user from the job 19 and map the name of the user to user profile information for the user. In another embodiment, the job pre-processor 93 may extract the name of a user from the job 19 and map the name of the user to items offered for auction or sale by the user. In another embodiment, the items or user may further be mapped to transactions associated with the items, feedback associated with the items, and other types of information. In some embodiments, the job pre-processor 93 may map one type of information to another type of information by making a call to a database server. The job executor 87 may further invoke the appropriate job parser 95 based on the job module identifier 60 in the job 19. The job parser 95 may break the job 19 into sub-jobs 20 that include tasks 39. In one embodiment the job parser 95 may break the job 19 into sub-jobs 20 according to equal quantities of work. For example, sub-jobs 20 may be identified based on equal quantities of items, transactions, quantity of data, etc. Finally, the job executor 87 may invoke the job post processor 97 to gather the results from the sub-jobs 20.

The scheduler 89 may utilize the job priority and remote resource information 33 (not shown) to identify whether remote resources 41 (not shown) are available for the sub-jobs 20. For example, the scheduler 89 may move a sub-job event 51 for a sub-job 20 to the sub-job queue 27 based on the priority of the job 19 (e.g., high, medium, low), the remote resources 41 to execute the sub-job 20, and an identification that the remote resources 41 are available. In addition, the scheduler 89 may move the job 19 to the job retry queue 29 responsive to identifying the processing time for the job 19 has expired. In one embodiment the scheduler 89 operates by a concept of fairness. For example, the scheduler 89 may ensure fairness by allocating remote resources to jobs 19 such that two jobs that are of the same size (e.g., quantity of data to process) and same priority will finish at the same time if they are started at the same time.

The sub-job executor 91 may identify the sub-job 20 on the sub-job queue 27 and invoke the appropriate task processor 99 based on the job module identifier 60 to execute the tasks 39 in the sub-job 20.

Figure 3A:
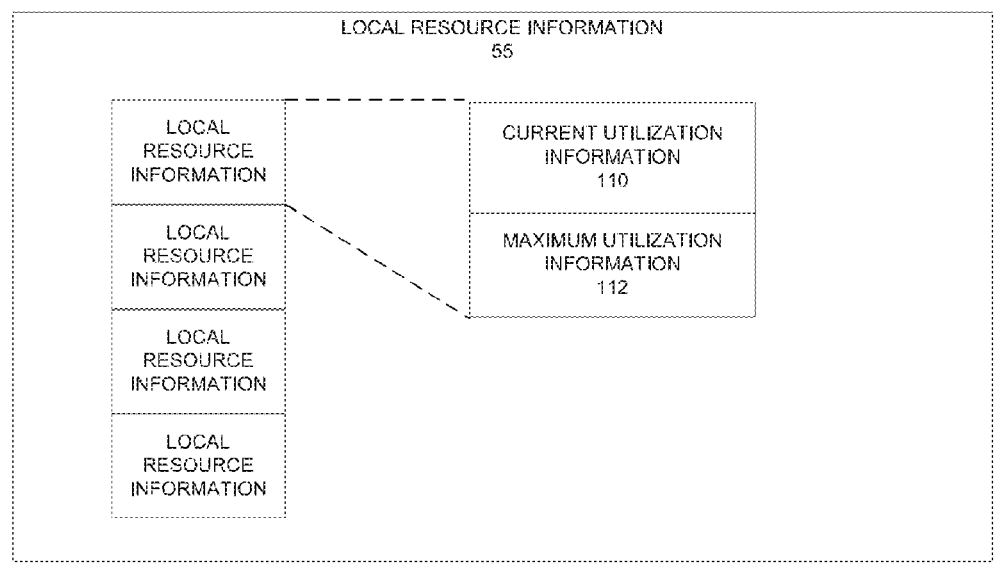
FIG. 3A is a block diagram illustrating local resource information, according to an embodiment.

FIG. 3A is a block diagram illustrating local resource information 55, according to an embodiment. The local resource information 55 may include multiple entries that respectively correspond to different pools of processing nodes 26. The local resource information 55 may include current utilization information 110 and maximum utilization information 112. The current utilization information 110 may be used to store a current utilization of local resources (e.g., memory, processors, etc.) by sub-jobs 20 for the associated pool of processing nodes 26. For example, the current utilization 110 may be stored as a normalized capacity that may be incremented coincident with moving a sub-job event 51 to the sub-job retry queue 53 and decremented responsive to completion of the sub-job 20. The quantity of capacity utilized by a particular sub-job 20 (e.g., the value incremented or decremented) may be based on the local resource requirements as identified by job information 63 in the corresponding job 19.

Figure 3B:
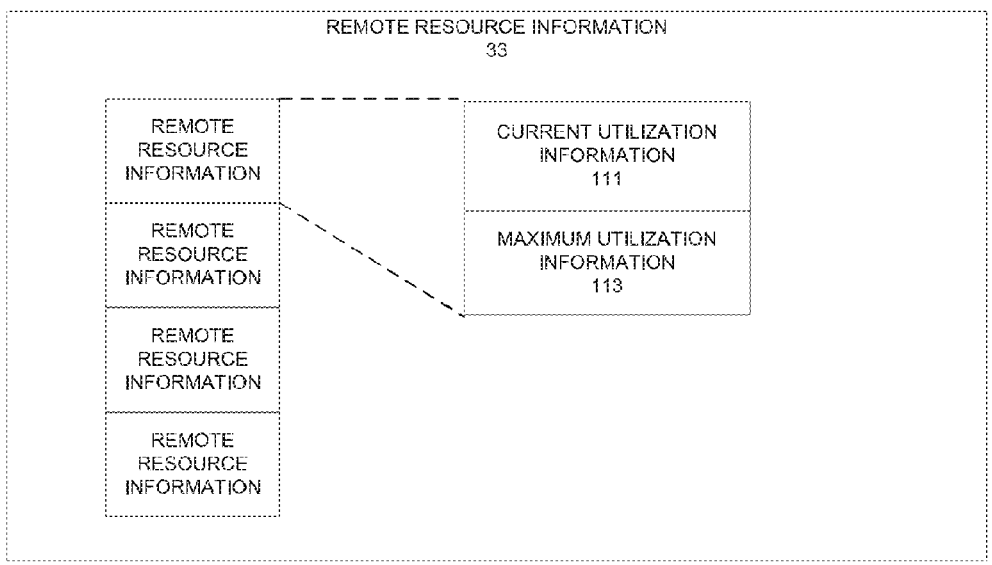
FIG. 3B is a block diagram illustrating remote resource information, according to an embodiment.

FIG. 3B is a block diagram illustrating remote resource information 33, according to an embodiment. The remote resource information 33 may include multiple entries that respectively correspond to different remote resources 41. For example, remote resource information 33 may be maintained for the database server resource pool 43. Also for example, remote resource information 33 may be maintained for the API server resource pool 45. The remote resource information 33 may include current utilization information 111 and maximum utilization information 113. The current utilization information 111 may be used to store a current utilization of remote resources (e.g., memory, processors, etc.) by sub-jobs 20. For example, the current utilization may be stored as a normalized capacity that may incremented coincident with moving a sub-job event 51 to the sub-job retry queue 53 and decremented responsive to completion of the sub-job 20. The quantity of capacity utilized by a particular sub-job 20 (e.g., the value incremented or decremented) may be based on the remote resource requirements as identified by job information 63 in the corresponding job 19.

FIG. 4 is a block diagram illustrating maximum utilization information 113, according to an embodiment. The maximum utilization information 113 is shown to include time information 115 and maximum utilization 117. The time information 115 may be in the form of an hour of the day (e.g., military time). According to one embodiment the maximum utilization 117 may include a normalized value representing a maximum quantity of remote resources 41 that may be utilized by the scatter gather peer-to-peer network 23 at the corresponding time. For example, a maximum normalized value of remote resources 41 that may be utilized by the scatter gather peer-to-peer network 23 at eight in the morning is shown to be five. This maximum utilization is the lowest because it corresponds to a peak usage of the remote resource 41 by competing processes 49. In one embodiment, the maximum normalized value of remote resources 41 that may be utilized by the scatter gather peer-to-peer network 23 may be generated based on an historic usage of the remote resources 41 by competing processes 49. In another embodiment, the maximum normalized value of remote resources 41 that may be utilized by the scatter gather peer-to-peer network 23 may be generated in real-time based on a measured usage of the remote resources 41 by competing processes 49. Accordingly, the scatter gather peer-to-peer network 23 may be throttled back to not exceed the maximum normalized value of remote resources 41 as determined according to an historic or measured minimum and maximum usage of remote resources 41 by competing processes 49.

Figure 5:
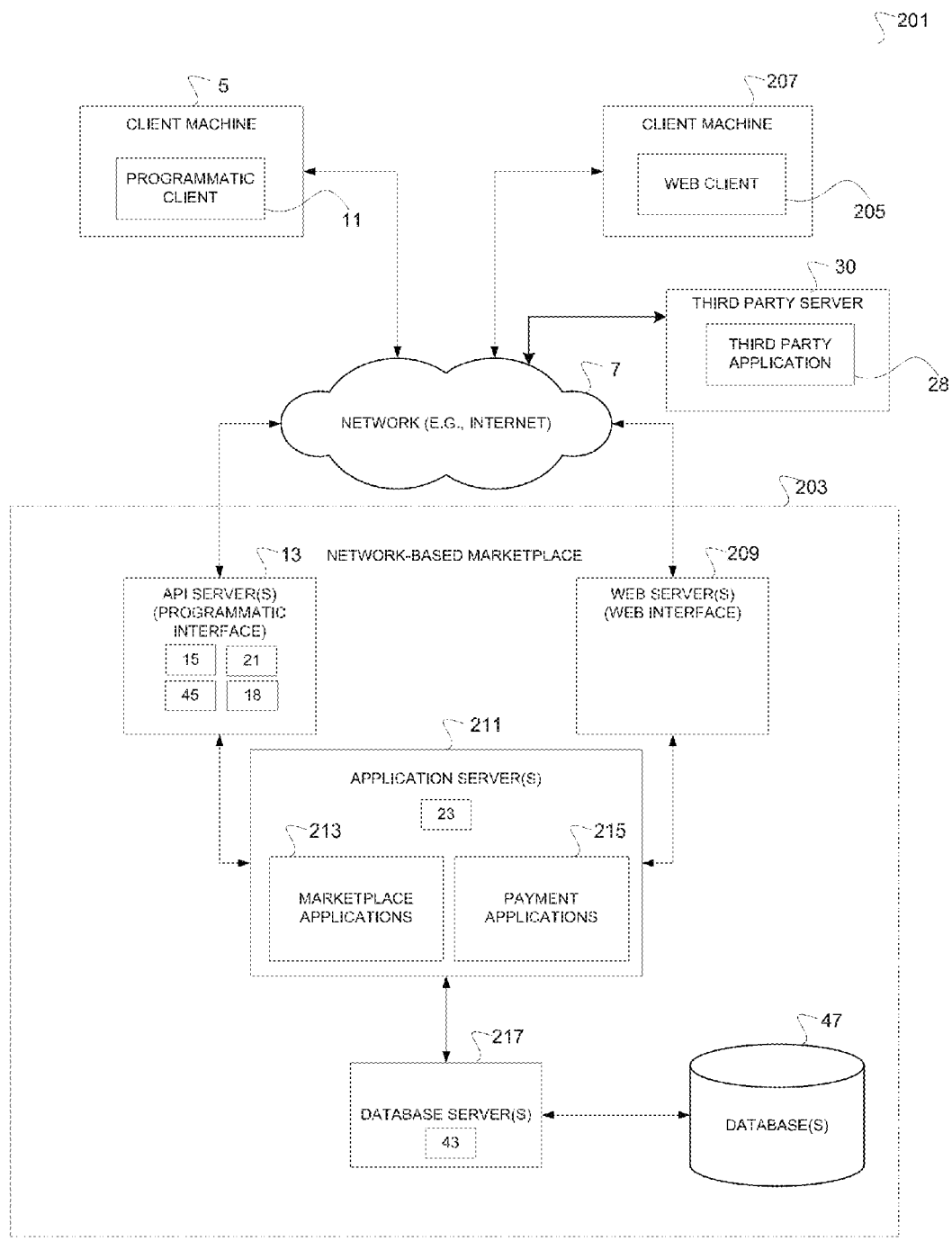
FIG. 5 is a block diagram illustrating a system, according to an embodiment, to process a request received at an application program interface.

FIG. 5 is a network diagram depicting a networked system 201, within which one example embodiment may be deployed. The system 201 corresponds to the system 3 in FIG. 1 and, accordingly, the same or similar references have been used to indicate the same or similar features unless otherwise indicated. A network-based marketplace 203 provides server-side functionality, via a network 7 (e.g., the Internet or Wide Area Network (WAN)) to one or more clients. FIG. 5 illustrates, for example, a web client 205 (e.g., a browser, such as the Internet Explorer browser developed by Microsoft Corporation of Redmond, Washinton State) executing on a client machine 207 and a programmatic client 11 executing on client machine 5.

An application program interface (API) server 13 and a web server 209 are coupled to, and provide programmatic and web interfaces respectively to, one or more application servers 211. The application servers 211 host one or more marketplace applications 213 and payment applications 215. The application servers 211 are, in turn, shown to be coupled to one or more database servers 217 that facilitate access to one or more databases 47. The application servers 211 may further include the scatter gather peer-to-peer network 23, as previously described.

The marketplace applications 213 may provide a number of marketplace functions and services to users that access the network-based marketplace 203. The payment applications 215 may likewise provide a number of payment services and functions to users. The payment applications 215 may allow users to accumulate value in accounts and then to later redeem the accumulated value for products (e.g., goods or services) that are made available via the marketplace applications 213. The value may be accumulated in a commercial currency, such as the U.S. dollar, or a proprietary currency, such as "points." While the marketplace applications 213 and payment applications 215 are shown in FIG. 5 to both form part of the network-based marketplace 203, it will be appreciated that, in alternative embodiments, the payment applications 215 may form part of a payment service that is separate and distinct from the network-based marketplace 203.

Further, while the networked system 201 shown in FIG. 5 employs a client-server architecture, embodiments of the present disclosure are of course not limited to such an architecture and could equally well find application in a distributed, or peer-to-peer, architecture system, for example. The various marketplace applications 213 and payment applications 215 could also be implemented as standalone software programs, which do not necessarily have networking capabilities.

The web client 205 and mobile programmatic client 11 access the various marketplace applications 213 and payment applications 215 via the web interface supported by the web server 209. Similarly, the programmatic client 11 accesses the various services and functions provided by the marketplace applications 213 and payment applications 215 via the programmatic interface provided by the API server 13. The programmatic client 11 may, for example, be a seller application (e.g., the TurboLister application developed by eBay Inc., of San Jose, Calif.) to enable sellers to author and manage listings on the network-based marketplace 203 in an off-line manner, and to perform batch-mode communications between the programmatic client 11 and the network-based marketplace 203. The API server 13 is shown to include the application program interface module 15, the scatter gather logical database 21, the monitor module 18, and API server resource pool 45, each as previously described.

FIG. 5 also illustrates a third party application 28, executing on a third party server machine 30, as having programmatic access to the networked system 201 via the programmatic interface provided by the API server 13. For example, the third party application 28 may, utilizing information retrieved from the network-based marketplace 203, support one or more features or functions on a website hosted by the third party. The third party website may, for example, provide one or more promotional, marketplace or payment functions that are supported by the relevant applications of the networked system 201.

Marketplace and Payment Applications

Figure 6:
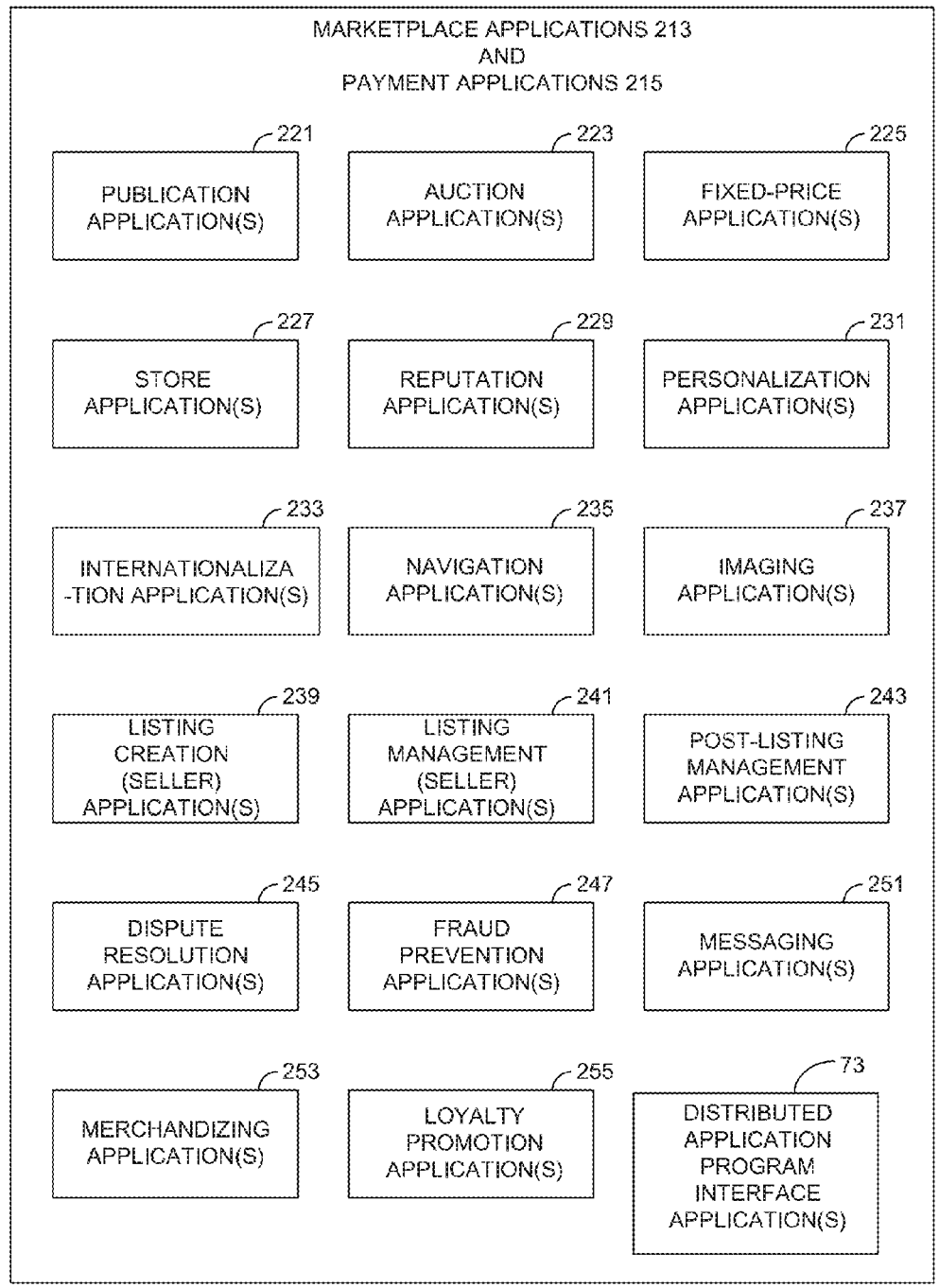
FIG. 6 is a block diagram illustrating marketplace applications and payment applications, according to an embodiment.

FIG. 6 is a block diagram illustrating marketplace applications 213 and payment applications 215 that, in one example embodiment, are provided as part of the networked system 201. The marketplace applications 213 and payment applications 215 may be hosted on dedicated or shared server machines, as shown on FIG. 5, that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 47 via the database servers 217, as shown on FIG. 5.

The network-based marketplace 203 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace applications 213 are shown to include at least one publication application 221 and one or more auction applications 223 which support auction-format listing and price setting mechanisms (e.g., English, Dutch, Vickrey, Chinese, Double, Reverse auctions, etc.). The various auction applications 223 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 225 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store application(s) 227 allows a seller to group listings within a "virtual" store, which may be branded and otherwise personalized by and for the seller. Such a virtual store may also offer promotions, incentives and features that are specific and personalized to a relevant seller.

Reputation applications 229 allow users that transact, utilizing the network-based marketplace 203, to establish, build and maintain reputations, which may be made available and published to potential trading partners. Consider that where, for example, the network-based marketplace 203 supports person-to-person trading, users may otherwise have no history or other reference information whereby the trustworthiness and credibility of potential trading partners may be assessed. The reputation applications 229 allow a user to establish a reputation within the network-based marketplace 203 over time, for example, through feedback provided by other transaction partners. Other potential trading partners may then reference such a reputation for the purposes of assessing credibility and trustworthiness.

Personalization applications 231 allow users of the network-based marketplace 203 to personalize various aspects of their interactions with the network-based marketplace 203. For example a user may, utilizing an appropriate personalization application 231, create a personalized reference page at which information regarding transactions to which the user is (or has been) a party may be viewed. Further, a personalization application 231 may enable a user to personalize listings and other aspects of their interactions with the networked system 201 and other parties.

The networked system 201 may support a number of marketplaces that are customized, for example, for specific geographic regions. A version of the networked system 201 may be customized for the United Kingdom, whereas another version of the networked system 201 may be customized for the United States. Some of these versions may operate as an independent marketplace, or may be customized (or internationalized) presentations of a common underlying marketplace. The networked system 201 may accordingly include a number of internationalization applications 233 that customize information (and/or the presentation of information) by the networked system 201 according to predetermined criteria (e.g., geographic, demographic or marketplace criteria). For example, the internationalization applications 233 may be used to support the customization of information for a number of regional websites that are operated by the networked system 201 and that are accessible via respective servers 13 and 209.

Navigation of the networked-based marketplace 203 may be facilitated by one or more navigation applications 235. For example, a receiving module may receive search information to search for items on the network-based marketplace 203, and a processing application may process that request. A browse application may allow users to browse various category, catalogue, or inventory data structures according to which listings may be classified within the networked system 201. Various other navigation applications may be provided to supplement the search and browsing applications.

In order to make listings available via the networked system 201 as visually informing and attractive as possible, the marketplace applications 213 may include one or more imaging applications 237 with which users may upload images for inclusion within listings. An imaging application 237 also operates to incorporate images within viewed listings. The imaging applications 237 may also support one or more promotional features, such as image galleries that are presented to potential buyers. For example, sellers may pay an additional fee to have an image included within a gallery of images for promoted items.

Listing creation applications 239 allow sellers to conveniently author listings pertaining to goods or services that they wish to transact via the network-based marketplace 203, while the listing management applications 241 allow sellers to manage such listings. Specifically, where a particular seller has authored and/or published a large number of listings, the management of such listings may present a challenge. The listing management applications 241 provide a number of features (e.g., auto-relisting, inventory level monitors, etc.) to assist the seller in managing such listings.

One or more post-listing management applications 243 may also assist sellers with a number of activities that may typically occur post-listing. For example, upon completion of an auction facilitated by one or more auction applications 223, a seller may wish to leave feedback regarding a particular buyer. To this end, a post-listing management application 243 may provide an interface to one or more reputation applications 229, so as to allow the seller conveniently to provide feedback regarding multiple buyers to the reputation applications 229.

Dispute resolution applications 245 may provide mechanisms whereby disputes arising between transacting parties may be resolved. For example, the dispute resolution applications 245 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 247 may implement fraud detection and prevention mechanisms to reduce the occurrence of fraud within the network-based marketplace 203.

Messaging applications 251 may be responsible for the generation and delivery of messages to users of the network-based marketplace 203, with such messages, for example, advising users regarding the status of listings at the network-based marketplace 203 (e.g., providing "outbid" notices to bidders during an auction process or providing promotional and merchandising information to users). Respective messaging applications 251 may utilize any one of a number of message delivery networks and platforms to deliver messages to users. For example, messaging applications 251 may deliver electronic mail (e-mail), instant message (IM), Short Message Service (SMS), text, facsimile, or voice (e.g., Voice over IP (VoIP)) messages via the wired network (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX-IEEE 802.16) networks.

Merchandising applications 253 support various merchandising functions that are made available to sellers to enable sellers to increase sales via the network-based marketplace 203. The merchandising applications 253 may also operate the various merchandising features that may be invoked by sellers and may monitor and track the success of merchandising strategies employed by sellers.

The network-based marketplace 203 itself, or one or more parties that transact via the network-based marketplace 203, may operate loyalty programs that are supported by one or more loyalty promotions applications 255. For example, a buyer may earn loyalty or promotions points for transactions established and/or concluded with a particular seller, and then be offered a reward for which accumulated loyalty points can be redeemed.

The network-based marketplace 203 may further include distributed application program interface applications 73, as previously described.

Data Structures

Figure 7:
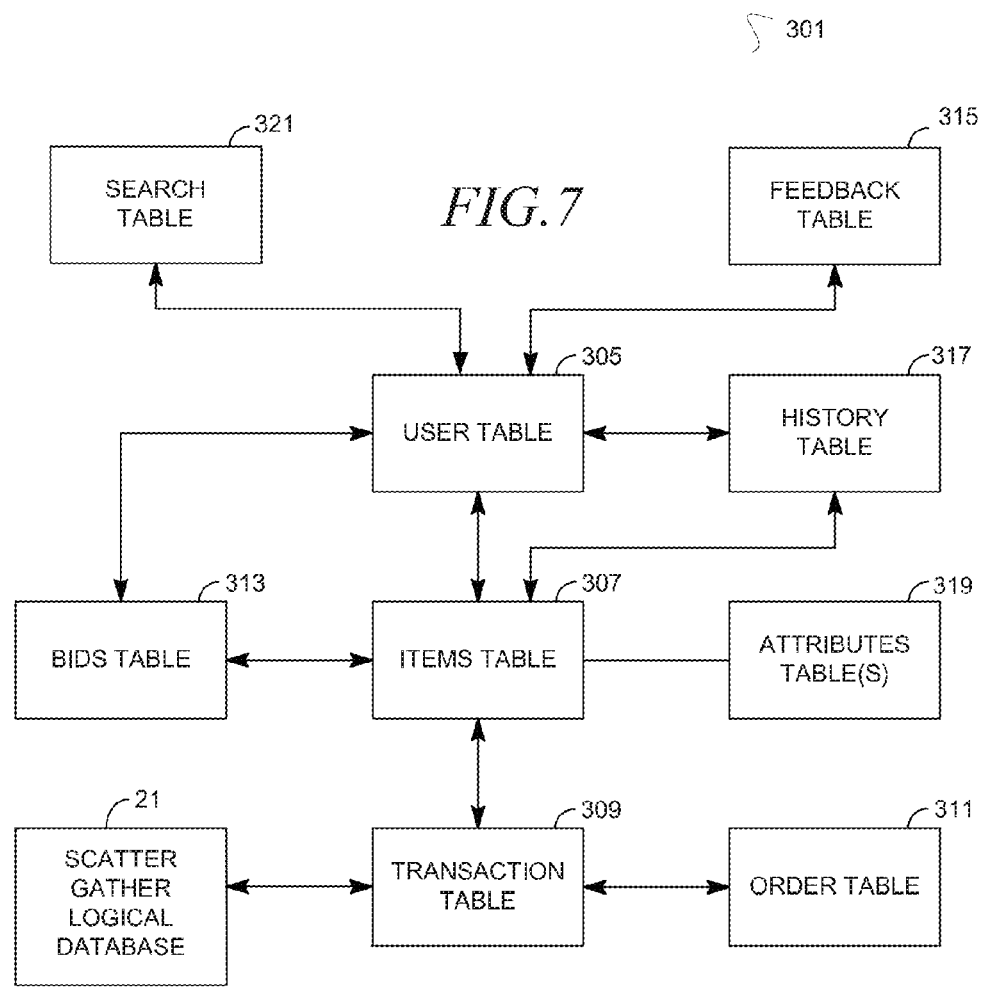
FIG. 7 is a block diagram illustrating tables, according to an embodiment.

FIG. 7 is a high-level entity-relationship diagram illustrating various tables 301 and logical databases 303 that may be maintained within the databases 47, and that are utilized by and support the marketplace applications 213 and payment applications 215. A user table 305 contains a record for registered users of the network-based marketplace 203. A user may operate as a seller, a buyer, or both, within the network-based marketplace 203. In one example embodiment, a buyer may be a user that has accumulated value (e.g., commercial or proprietary currency), and is accordingly able to exchange the accumulated value for items that are offered for sale by the network-based marketplace 203.

The tables 301 also include an items table 307 in which item records are maintained for goods and services that are available to be, or have been, transacted via the network-based marketplace 203. Item records within the items table 307 may furthermore be linked to one or more user records within the user table 305, so as to associate a seller and one or more actual or potential buyers with an item record.

A transaction table 309 contains a record for each transaction (e.g., a purchase or sale transaction) pertaining to items for which records exist within the items table 307.

An order table 311 may be populated with order records, with each order record being associated with an order. Each order, in turn, may be associated with one or more transactions for which records exist within the transaction table 309.

Bid records within a bids table 313 may relate to a bid received at the network-based marketplace 203 in connection with an auction-format listing supported by an auction application 42. A feedback table 315 may be utilized by one or more reputation applications 229, in one example embodiment, to construct and maintain reputation information concerning users. A history table 317 may be used to maintain a history of transactions to which a user has been a party. One or more attributes tables 319 record attribute information pertaining to items for which records exist within the items table 307. Considering only a single example of such an attribute, the attributes tables 319 may indicate a currency attribute associated with a particular item, with the currency attribute identifying the currency of a price for the relevant item as specified in by a seller.

A search table 321 may store search information that has been entered by a user (e.g., buyer) who is looking for a specific type of listing. A scatter gather logical database 21 may further be used as previously described.

Methods of Operation

Figure 8:
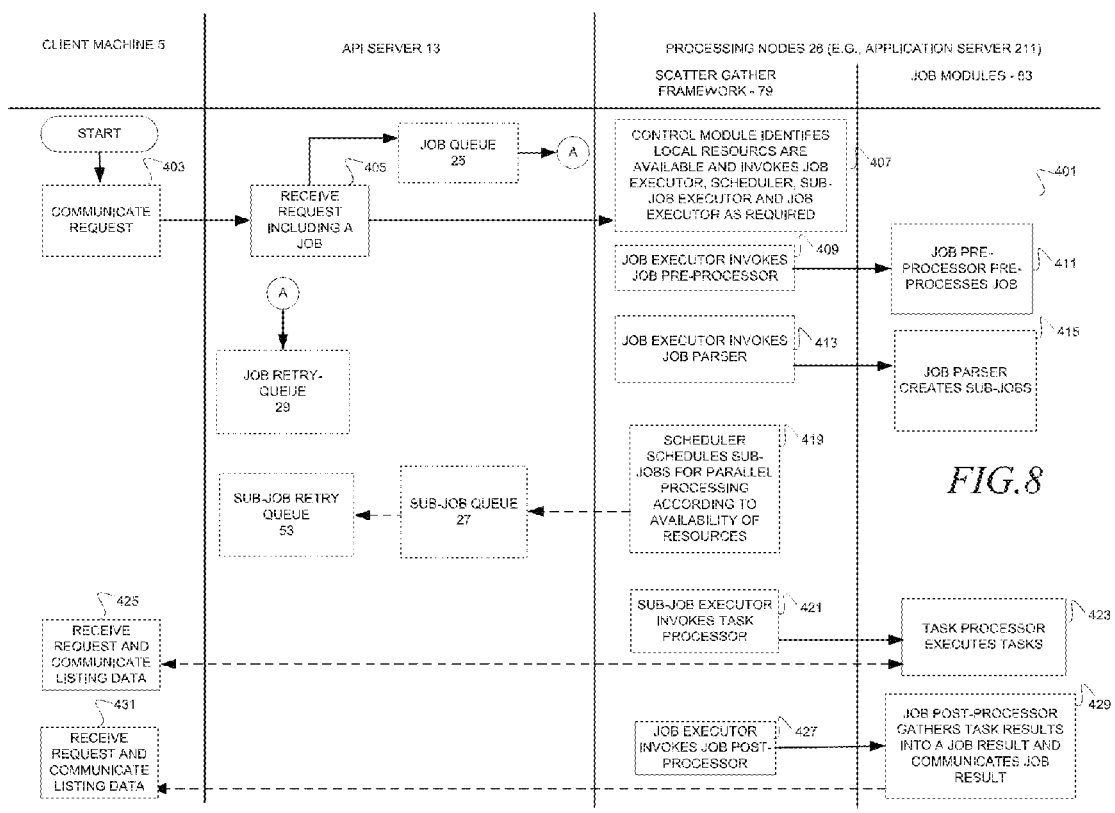
FIG. 8 is a flow chart illustrating a method, according to an embodiment, to process a request that is received at an application program interface.

FIG. 8 is a flow chart illustrating a method 401, according to an embodiment, to process a request that is received at an application program interface. Illustrated on the left of FIG. 8 are operations performed at the client machine 5. Illustrated in the middle are operations performed at the application programming interface server 13 (e.g., server machine). Illustrated on the right are operations performed at the processing node 26 (e.g., server machine). Operations illustrated on the middle right are performed by the scatter gather framework 79 and operations illustrated on the right are performed by job modules 83.

The method 401 commences, at operation 403, with the client machine 5 communicating a request that includes a job 19 to the API server 13. In one embodiment, the job 19 may include a request to add listings on a network-based marketplace 203 by retrieving listing information from the client machine 5.

At operation 405, the API server 13 receives the request and stores the job 19 in the job table 35, generates a job event 37 and stores the job event 37 on the job queue 25.

At operation 407, at the processing node 26, the controller module 85 may identify that sufficient local resources are available to process the job 19. For example, the controller module 85 may determine, according to an embodiment, that an adequate number of processors 75 and memory 77 are available to process the job 19. Next, the controller module 85 may invoke the job executor 87.

At operation 409 the job executor 87 may invoke the job pre-processor 93 based on the job type in the job 19, and at operation 411 the job pre-processor 93 may pre-process the job 19. For example, the job pre-processor 93 may identify that the job 19 includes a request to add listings on a network-based marketplace 203 and attempt to identify whether the user that is making the request has an account on the network-based marketplace 203. For example, the job pre-processor 93 may request the user be looked up in the user table 305. At operation 413, the job executor 87 may invoke the job parser 95. At operation 415, the job parser 95 parses the job 19 into sub-jobs 20 that include tasks 39. In one embodiment, the job parser 95 may parse the job 19 and generate sub-jobs 20 along with the appropriate tasks 39 according to categories on the network-based marketplace 203 that are to receive the listings. For example, the job 19 may specify that ten listings are to be added to the toys category, five listings are to be added to the book category, and three listings are to be added to the IPod category. Accordingly, the job parser 95 may create three sub-jobs 20 that respectively include similar tasks 39 for the toys, books, and IPods categories. For example, each sub-job 20 may include tasks 39 to retrieve listing data for listings to be added to the appropriate category from the client machine 5 and a task to add the listings to the appropriate category responsive to receiving the listing data from the client machine 5.

At operation 419, the scheduler 89 may schedule sub-job events 51 on the sub-job queue 27 and/or sub-job events 51 on the sub-job retry queue 53 provided that adequate local and remote resources 41 are available to process the sub-jobs 20, as described in more detail later.

At operation 421, the sub-job executor 91, at the same or different processing node 26, may retrieve a sub-job event 51 from the sub-job queue 27 or the sub-job retry queue 53 and invoke the appropriate task processor 99 based on the job type in the corresponding job 19. It will be appreciated that operation 421 may be performed by multiple processing nodes 26 in parallel. The processing nodes 26 may continue to process the sub-job events 51 until all of the sub-job events 51 associated with the job 19 are completed. At operation 423, the task processor 99 may execute the tasks 39 in the sub-job 20. In the present example, the task processor 99 may execute a task 39 that utilizes an API server 13 from the API server resource pool 45 to request listing data from the client machine 5, as illustrated by the dashed line to operation 425, where the client machine 5 receives a request for listing data. In response to the request, the client machine 5 may communicate the listing data to the task processor 99 on the processing node 26. Further, at operation 423, the task processor 99 may execute a task that utilizes a database server in the database server resource pool 43 to add the listings to the items table 307 on the network-based marketplace 203. At operation 427, the job executor 87 which determines that all of the sub-jobs 20 associated with the job 19 are completed and invokes the job post-processor 97. At operation 429, the job post-processor 97 may gather the task results from each of the sub-jobs 20 and communicates the job results to the client machine 5.

At operation 431, the client machine 5 may receive the job results. For example, the job results may include job result information that indicates whether the request to add the listings was successful or whether the request failed.

The above example relates the job 19 as being processed through to completion without interruption. Nevertheless, it will be appreciated by one skilled in the art that the job 19 may have been interrupted for lack of local resources 71 or for some other reasons. In such cases, the job event may be moved to the job retry queue 29 and a timeout may be set which upon expiration may result in further processing of the job 19, as previously described.

FIG. 9A is a flow chart illustrating a method 451, according to an embodiment, to schedule sub-jobs 20 of different priorities for parallel processing. The method 451 corresponds to the operation 419 on FIG. 8. The method 451 commences at operation 453 with the scheduler 89 attempting to schedule sub-jobs 20 with a high priority. For example, the scheduler 89 may attempt to identify whether remote resources 41 are available for a particular sub-job 20, as described further below. If the remote resources 41 are available the scheduler 89 may store a sub-job event 15 on the sub-job queue 27, as previously described. At operation 455, the scheduler 89 attempts to schedule sub-jobs 20 with a medium priority, and at operation 457 the scheduler 89 attempts to schedule sub-jobs 20 with a low priority.

FIG. 9B is a flow chart illustrating a method 475, according to an embodiment, to schedule sub-jobs 20 of the same priority for parallel processing. The method 475 corresponds to each of the operations 453, 455, or 457 on FIG. 9A. The method 475 commences at operation 477 with the scheduler 89 identifying the local resources 71 that are required to execute a sub-job 20. In one embodiment the quantity of local resources 71 for the sub-job may be determined by the job information 63 for the corresponding job 20. At operation 479, the scheduler 89 identifies a quantity of local resources 71 that are currently being utilized to process sub-jobs 20. For example, local resources 71 that are currently being utilized to process sub-jobs 20 may be identified in the current utilization information 110. At operation 481, the scheduler 89 may identify the maximum utilization of local resources 71 that may be utilized to process sub-jobs 20. For example, the maximum utilization of local resources 71 may be identified in the maximum utilization information 112. At decision operation 483, the scheduler 89 may provisionally determine to schedule the sub-job 20 based on the local resources 71 required to execute the sub-job 20, the local resources 71 currently utilized to process sub-jobs 20, and the maximum utilization of local resources 71 to process sub-jobs 20. For example, the scheduler 89 may identify that scheduling the sub-job 20 may bump the current utilization to an amount that is less than the maximum acceptable utilization of local resources 71. If the scheduler 89 determines there is sufficient capacity for processing the sub-job 20, then a branch is made to operation 485. Otherwise a branch is made to operation 495.

At operation 485 the scheduler 89 identifies whether sufficient remote resources 41 are available as utilized by the sub-job 20.

At operation 485 the scheduler 89 identifies the remote resources 41 required to execute a sub-job 20. In one embodiment the quantity of remote resources 41 for the sub-job 20 may be determined via the job information 63 for the corresponding job 20. At operation 487, the scheduler 89 identifies a quantity of remote resources 41 that are currently being utilized to process sub-jobs 20. For example, remote resources 41 that are currently being utilized to process sub-jobs 20 may be identified in the current utilization information 111. At operation 489, the scheduler 89 may identify the maximum utilization of remote resources 41 that may be utilized to process sub-jobs 20. For example, the maximum utilization of remote resources 41 may be identified in the maximum utilization information 113. At decision operation 491, the scheduler 89 may determine to schedule the sub-job 20 based on the remote resources 41 required to execute the sub-job 20, the remote resources 41 currently utilized to process sub-jobs 20, and the maximum utilization of remote resources 41 to process sub-jobs 20. For example, the scheduler 89 may identify that scheduling the sub-job 20 may bump the current utilization to an amount that is less than the maximum acceptable utilization of remote resources 41. If the scheduler 89 determines there is sufficient capacity for processing the sub-job 20, then a branch is made to operation 493. Otherwise a branch is made to operation 495.

At operation 493 the scheduler 89 schedules the sub-job 20. For example, the sub-job 20 is moved to the sub-job queue 27, the job 19 is moved to the job queue 25 and the process ends.

At operation 495, the scheduler 89 moves the job 19 to the job-retry queue 29 and the sub-job 20 to the sub-job table 31 and the process ends. The above method 475 may be iterated for other sub-jobs 20 of similar priority on the sub-job queue 27.

Figure 10A:
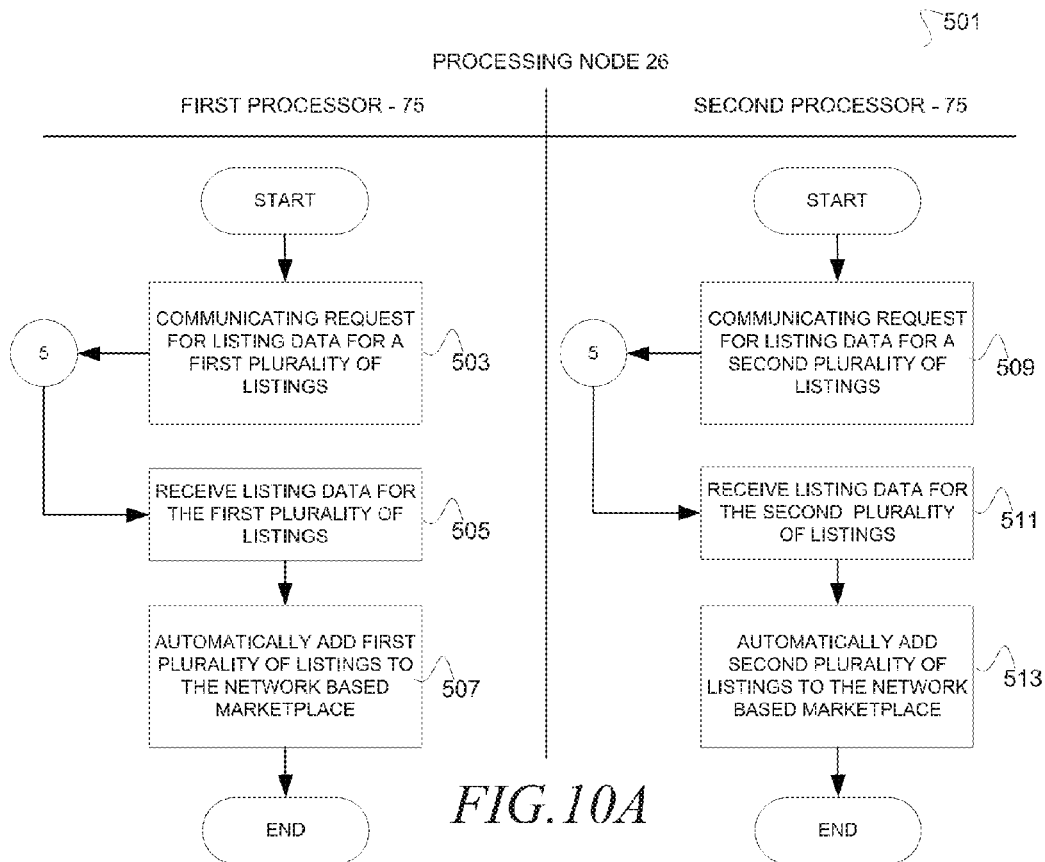
FIG. 10A is a flow chart illustrating a method, according to an embodiment, to execute tasks.

FIG. 10A is a flow chart illustrating a method 501, according to an embodiment, to execute sub-jobs 20 in parallel. The method 501 commences at operation 503 at a first processor 75 with the task processor 99 communicating a request for listing data for a first plurality of listings to the client machine 5. For example, the task processor 99 may communicate a request to the client machine 5 for listing data for listings to be added to the toy category. At operation 505, the first processor 75 may receive the listing data for a first plurality of listings (e.g., listings to be added to the toy category). At operation 507, the first processor 75 may automatically add the first plurality of listings to the network-based marketplace 203. For example, the first processor 75 may add the first plurality of listings in the toy category.

At operation 509, at a second processor 75, the task processor 99 communicates a request for listing data for a second plurality of listings to the client machine 5. The second processor 75 is illustrated as being located on the same processing node 26 as the first processor 75; however, it will be appreciated by one having ordinary skill in the art that the second processor 75 may be located on a different processing node 26. For example, the task processor 99 may communicate a request for listing data for listings to be added to the book category. At operation 511, the second processor 75 may receive the listing data for a second plurality of listings (e.g., listings to be added to the book category). At operation 513, the second processor 75 may automatically add the second plurality of listings to the network-based marketplace 203. For example, the second processor 75 may add the second plurality of listings in the book category.

Figure 10B:
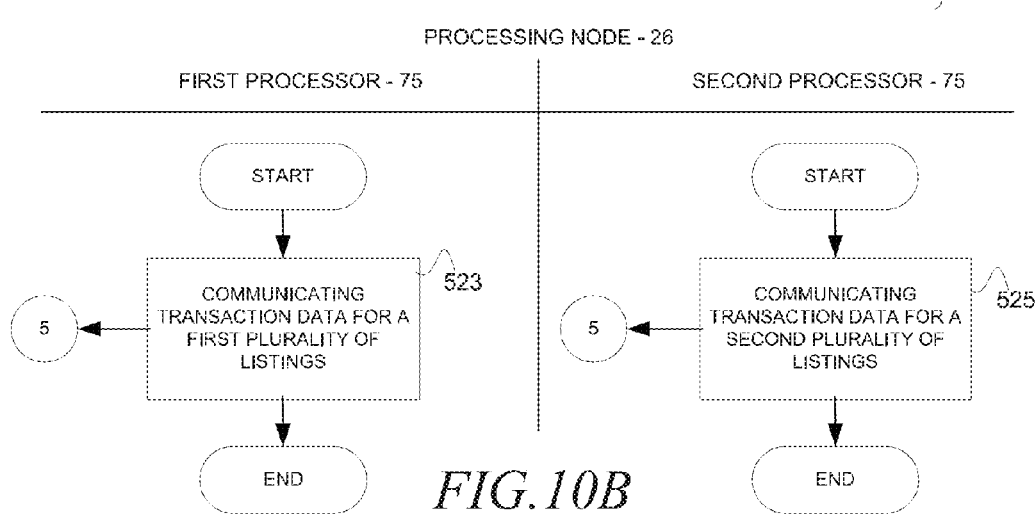
FIG. 10B is a flow chart illustrating a method, according to an embodiment, to execute tasks.

FIG. 10B is a flow chart illustrating a method 521, according to an embodiment, to execute sub-jobs in parallel. The method 521 commences at operation 523 at a first processor 75 with the task processor 99 communicating transaction data for a first plurality of listings to the client machine 5. For example, the task processor 99 may communicate transaction data in the form of transactions for listings in the toy category that are associated with a particular user, and the sub-job 20 ends.

At operation 525, at a second processor 75, the task processor 99 communicates transaction data for a second plurality of listings to the client machine 5. For example, the task processor 99 may communicate transaction data in the form of transactions for listings in the book category that are associated with a particular user, and the sub-job 20 ends.

Figure 11:
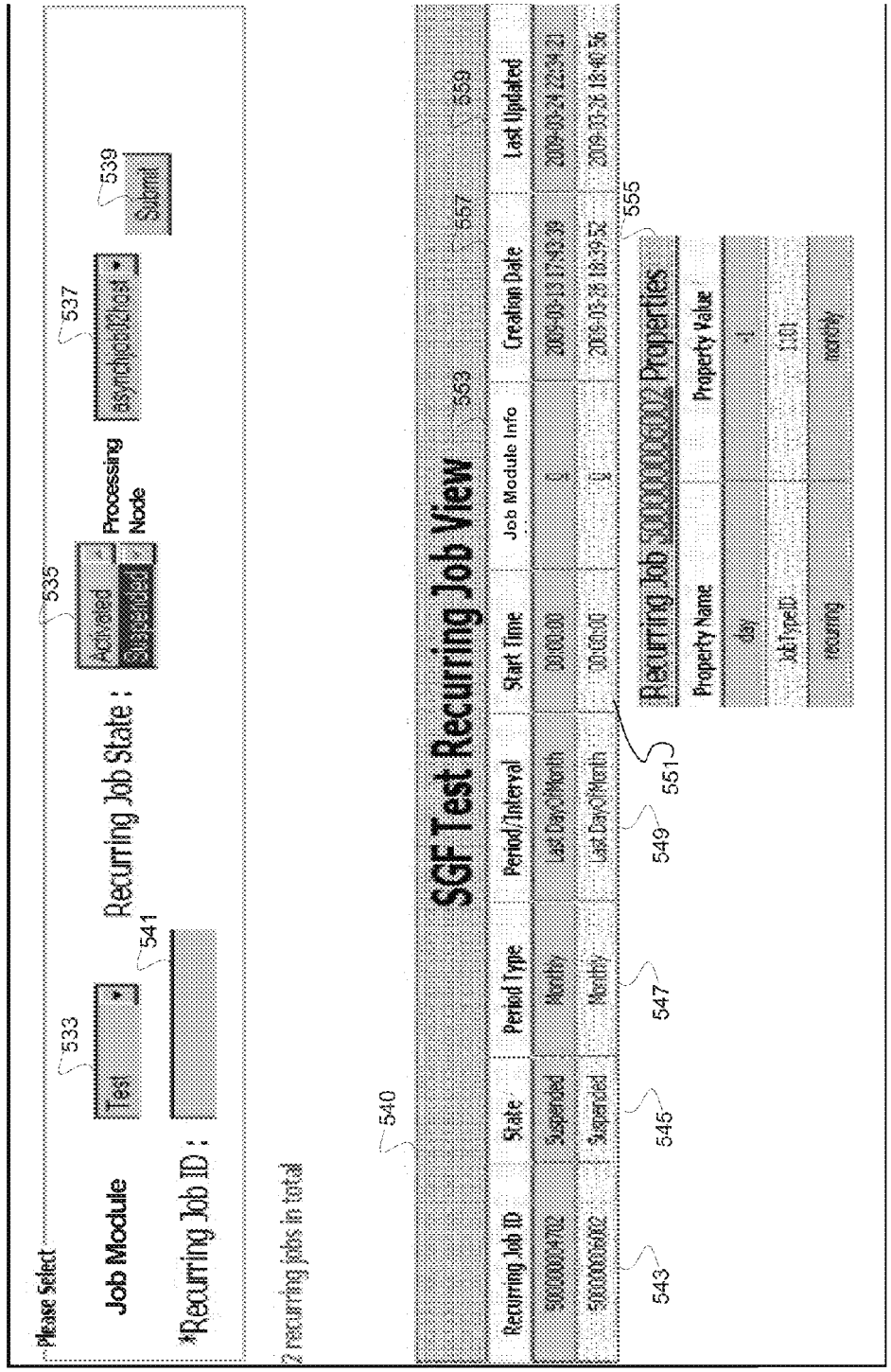

FIG. 11 is a diagram illustrating a user interface 531, according to an embodiment, to activate and suspend a recurring job 19. The user interface 531 may be used to activate or suspend a recurring job 19 that executes periodically. The user interface 531 includes user interface elements 533, 535, 537 and 541 in the form of search parameters to identify recurring jobs 19 for display, activation, and suspension. The user interface element 533 may be used to receive a jobs module 81. For example, a user operating the monitor machine 22 may select the jobs module 81 from a pull-down menu. The user interface element 535 may be used to receive a job state of "activated" or "suspended." Accordingly, an "activated" job 19 may be "suspended" and vice versa. The user interface element 537 may be used to receive the identified processing node 26 thereby limiting the search for jobs 19 to the designated processing node 26. In one embodiment, the user interface element 537 may be used to receive an identifier for "ALL" processing nodes 26. The user interface element 539 may be selected to submit the previously described search parameters. In response to the selection of user interface element 539, the monitor module 18 receives the search parameters, identifies the requested information in the statistical information 34 and displays the requested information in a display area 540.

The user interface 531 provides another approach to activate and suspend a recurring job 19. The user interface element 541 may be used to receive a job identifier to identify a particular reoccurring job 19. In response to the selection, the monitor module 18 may identify the reoccurring job 19 and displays the reoccurring job 19 in the display area 540.

The display area 540 includes columns 543, 545, 547, 549, 551, 553, 557 and 559. The column 543 displays a recurring job identifier that is associated with a particular job 19 that uniquely identifies the job 19 from other jobs 19. The column 545 displays the job state, as previously described. The column 547 displays a period type for job execution. For example, the period type may include a standard unit of time such as a day, week, month, bi-monthly, etc. The column 549 displays a period interval for job execution. The period interval identifies a particular moment to initiate the job 19 during the period type. The column 551 may display the start time for the job 19. The column 553 may display job information that may be collected for a job 19. The information collected may be defined by the author of the job module 81. In one embodiment, a row in the column 553 may be selected to display a pop-up window 555 that includes job information associated with the corresponding job 19. The column 557 may be used to display a creation date of the job 19. The column 559 may be used to display a date that the job 19 was last updated on the user interface 531.

Figure 12:
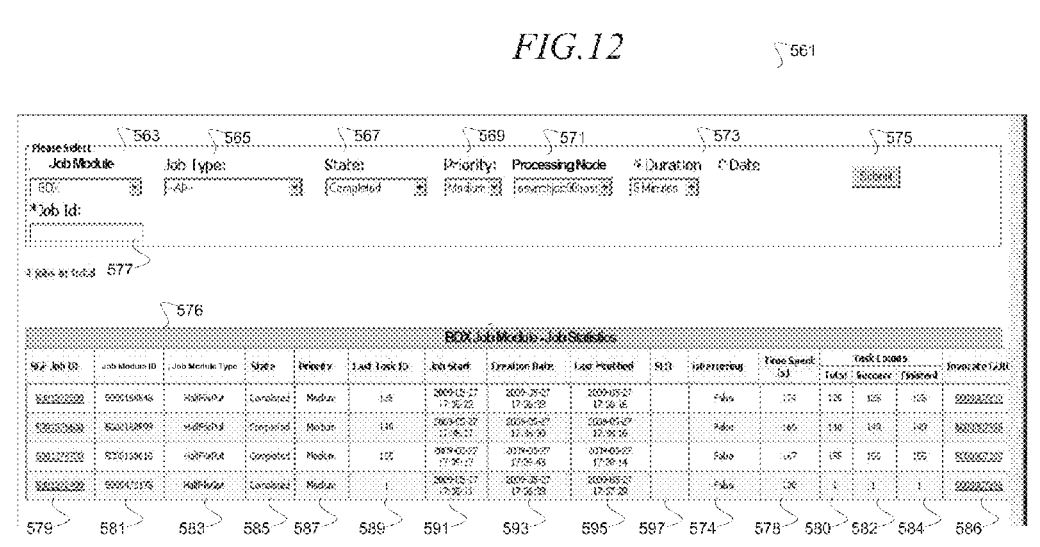

FIG. 12 is a diagram illustrating a user interface 561, according to an embodiment, to monitor jobs 19. The user interface 561 includes user interface elements 563, 565, 567, 569, 571, 573 and 577 in the form of search parameters to identify jobs 19 for monitoring. The user interface element 563 may be used to receive a job module 81. For example, the user interface 561 is illustrated to display a "BDX" job module 603 as selected. The user interface element 565 may be used to receive a job type. The job type may be defined by the author of the job module 81. The user interface element 567 may be used to receive a job state. For example, job states may include "completed" and "failed." The user interface element 569 may be used to receive a job priority. For example, the job priority may be defined by the author of the job module 81. In one embodiment, the job priorities may include "low", "medium", and "high." The user interface element 571 may be used to receive an identifier for a processing node 26, as previously described. The user interface element 573 may be used to define a window of time. For example, any job 19 that executes during the window of time may be displayed on the user interface 561. The user interface element 575 may be selected to submit the previously described search parameters. In response to the selection of user interface element 575, the monitor module 18 receives the search parameters, identifies the requested jobs 19 in the statistical information 34 and respectively displays the jobs 19 in the rows of a display area 576.

The user interface 561 further provides for displaying information for a particular job 19. For example, the user interface element 577 may receive a scatter gather job identifier to identify a particular job 19. In response to the selection of user interface element 575, the monitor module 18 receives the search parameter in the form of the scatter gather job identifier, identifies the requested job 19 in the statistical information 34 and displays the job 19 the display area 576.

The display area 576 includes columns 579, 581, 583, 585, 587, 589, 591, 593, 595, 597, 574, 578, 580, 582, 584 and 586. The column 579 displays a scatter gather framework job identifier that is associated with a particular job 19 and uniquely identifies the job 19 from other jobs 19. The column 581 displays a job module identifier that is associated with a particular job 19 that uniquely identifies the job 19 from other jobs 19 processed by the particular job module 83. The column 583 displays a job type, as previously described. The column 585 displays a job state, as previously described. The column 587 displays a job priority, as previously described. The column 589 displays a task identifier of the last task 39 of the job 19 to execute during the identified window of time. The column 591 displays a time the job 19 started. The column 593 displays a date the job 19 was created. The column 595 displays a date and time the job 19 was last modified. The column 597 displays whether a service level objective (SLO) was reached for a job. For example, a service level objective may define performance standards that may be applied against the actual performance of the job 19 to determine whether execution of the job 19 exceeded or fell below the service level objective. The column 574 may display a recurring status for the job 19. For example, the job 19 may be reoccurring or non-reoccurring (e.g., one-time execution). The column 578 may display an elapsed time measured by the start and end of the job 19. The column 580 may display the total number of tasks 39 in the job 19. The column 582 may display the number of tasks 39 that are successfully completed by job 19. The column 584 may display tasks 39 that are finished by job 19. The column 586 may display a unique identifier for the underlying event.

FIG. 13 is a diagram illustrating a user interface 601, according to an embodiment, to monitor statistics for aggregated jobs 19. The user interface 601 includes user interface elements 603, 605, 607, 609, 613, and 615 in the form of search parameters to display statistics for aggregated jobs 19. The user interface element 603 may be used to receive an identifier of a job module 81. For example, the user interface 601 is illustrated as receiving an identifier for the "BDX" job module 603. The user interface element 605 may be used to receive a job type, as previously described. The user interface element 607 may be used to receive a job priority. The user interface element 609 may be used to receive a job state, as previously described. The user interface element 613 may be used to group jobs 19 according to job type and/or job priority and/or job state. The user interface element 615 may be selected to define a window of time, as previously described. In response to the selection of user interface element 617, the monitor module 18 receives the search parameters, identifies the aggregate of jobs 19 in the statistical information 34 and displays the requested information for the aggregate of jobs 19 in a display area 619.

The display area 619 includes columns 621, 623, 625, 627, 629, 631, 633, 635, 637, 639, 641, 643 and 645. The column 621, 623, and 625 collectively identify an aggregate of jobs 19 according to a job type, a job priority, and a job state, respectively that are processed by the "BDX" job module 83. The column 627 may display a count of jobs 19 for the indicated aggregate of jobs 19. The column 629 may display a count of reoccurring jobs 19 for the indicated aggregate of jobs 19. The columns 631, 633, and 635 may respectively display counts of tasks, as previously described, for the indicated aggregate of jobs 19. The column 637 may display the minimum time elapsed for execution of a job 19 in the indicated aggregate of jobs 19. The column 639 may display the maximum time elapsed for execution of a job 19 in the indicated aggregate of jobs 19. The column 641 may display the average time elapsed for execution of a job 19 as computed for the aggregate of jobs 19. The column 643 may display a maximum service level objective for a particular job 19 in the indicated aggregate of jobs 19, and the column 645 may display an average service level objective for the aggregate of jobs 19.

Figure 14:
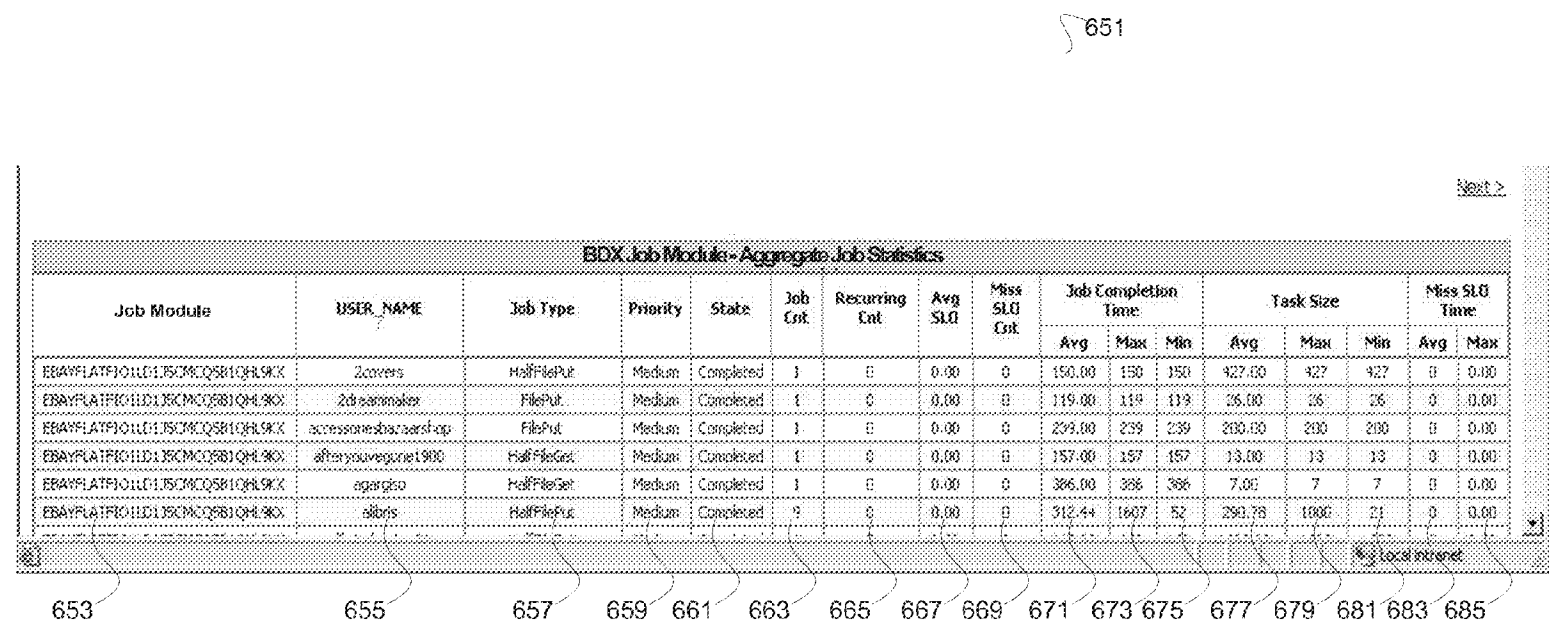

FIG. 14 is a diagram illustrating a user interface 651, according to an embodiment, to monitor statistics for aggregated jobs 19. The user interface 651 includes columns 653, 655, 657, 659, 661, 663, 665, 667, 669, 671, 673, 675, 677, 679, 681, 683 and 685. The columns 653, 655, 657, 659, and 661 may collectively identify a specific aggregate of jobs 19 according to a job module 81, a user name, a job type, a job priority, and a job state, respectively. The column 655 may display the user name of the user that created the identified aggregate of jobs 19. The column 663 may display a count of jobs 19 for the indicated aggregate of jobs 19. The column 665 may display a count of reoccurring jobs 19 for the indicated aggregate of jobs 19. The column 667 may display the average service level objective for the indicated aggregate of jobs 19. The column 669 may display the number of jobs 19 missing service level objective (SLO). The column 671 may display the average completion time for the indicated aggregate of jobs 19. The columns 673 and 675 may respectively display the maximum and minimum job 19 completion times. The column 677 may display the average task count for the indicated aggregate of jobs 19. The columns 679 and 681 may respectively display the maximum and minimum task counts corresponding to particular jobs 19. The column 683 may display average time the jobs missed the SLO. The column 685 may display maximum time the jobs 19 missed the SLO.

FIG. 15 is a diagram illustrating a user interface 689, according to an embodiment, to monitor statistics for aggregated tasks. The user interface 689 includes columns 691, 693, 694, 695, 696, 697, 698, and 699. The columns 691, 693, 694, and 695 collectively identify a specific aggregate of tasks 39 according to a remote resource 41, an action, a task state, and a reason code respectively. The column 696 may display a count of tasks 39 in the aggregate of tasks. The column 697 may display an average response time to access the remote resource 41 for the aggregate of tasks. The columns 698 and 699 may respectively display the maximum and minimum job 19 response times to for a particular task 39 to access the remote resource 41.

Figure 16:
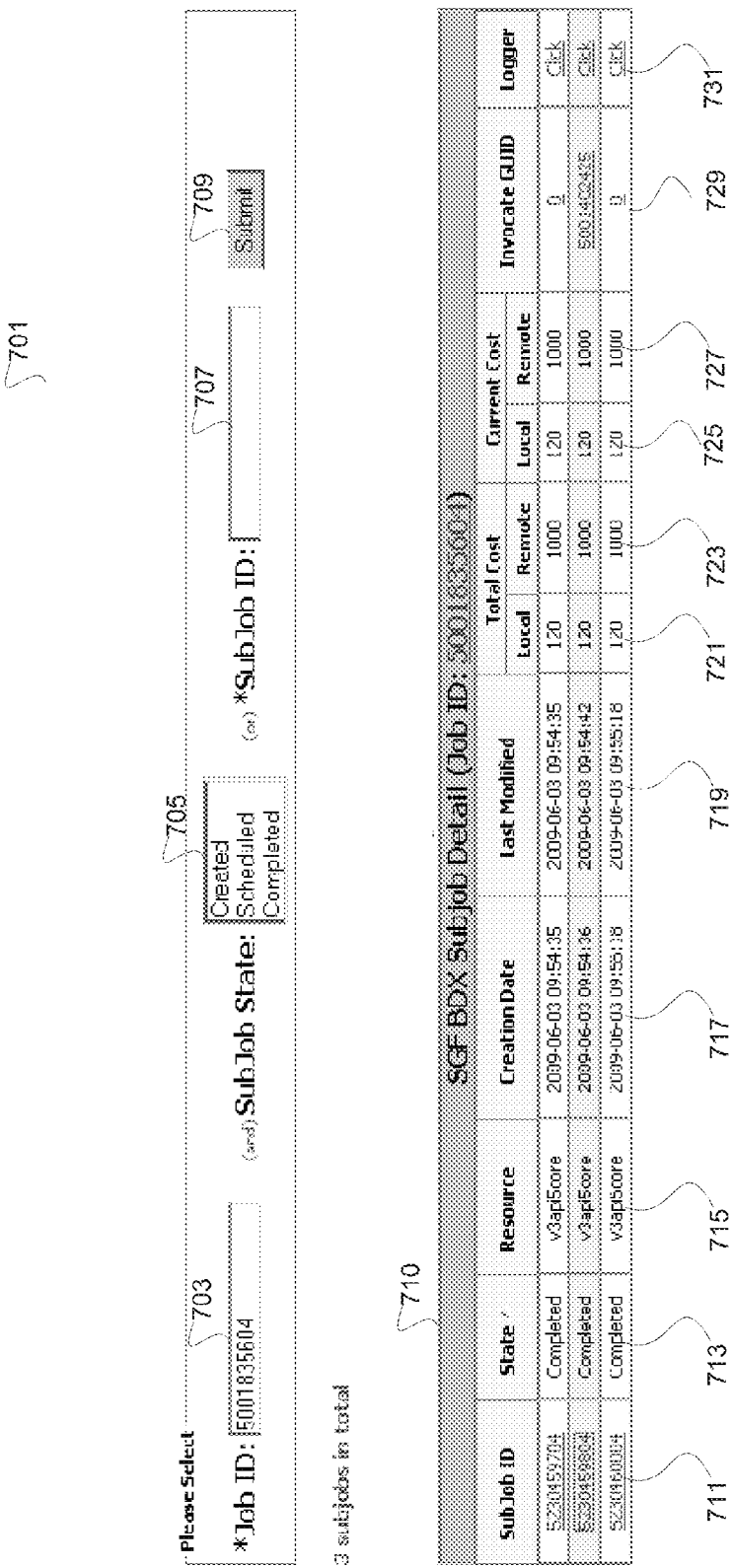

FIG. 16 is a diagram illustrating a user interface 701, according to an embodiment, to monitor sub-jobs 20 associated with a job 19. The user interface 701 may include user interface elements 703, 705, 707 and 709 in the form of search parameters to identify statistical information 34 for display. The user interface element 703 may receive a scatter gather job identifier to identify a particular job 19. For example, a user operating the monitor machine 22 may enter the scatter gather job identifier. In another embodiment the user interface element 703 may receive a scatter gather job identifier that is previously selected from the column 579 on the user interface 561, as shown on FIG. 12. The user interface element 705 may be used to receive a sub-job state. In one embodiment, the sub-job states may include "created," "scheduled" and "completed." The user interface element 707 may be used to receive a sub-job identifier that identifies a sub-job 20. The user interface element 709 may be selected to submit the previously described search parameters. In response to the selection of user interface element 709, the monitor module 18 receives the search parameters, identifies the requested information in the statistical information 34 and displays the requested information in a display area 710.

Figure 17:
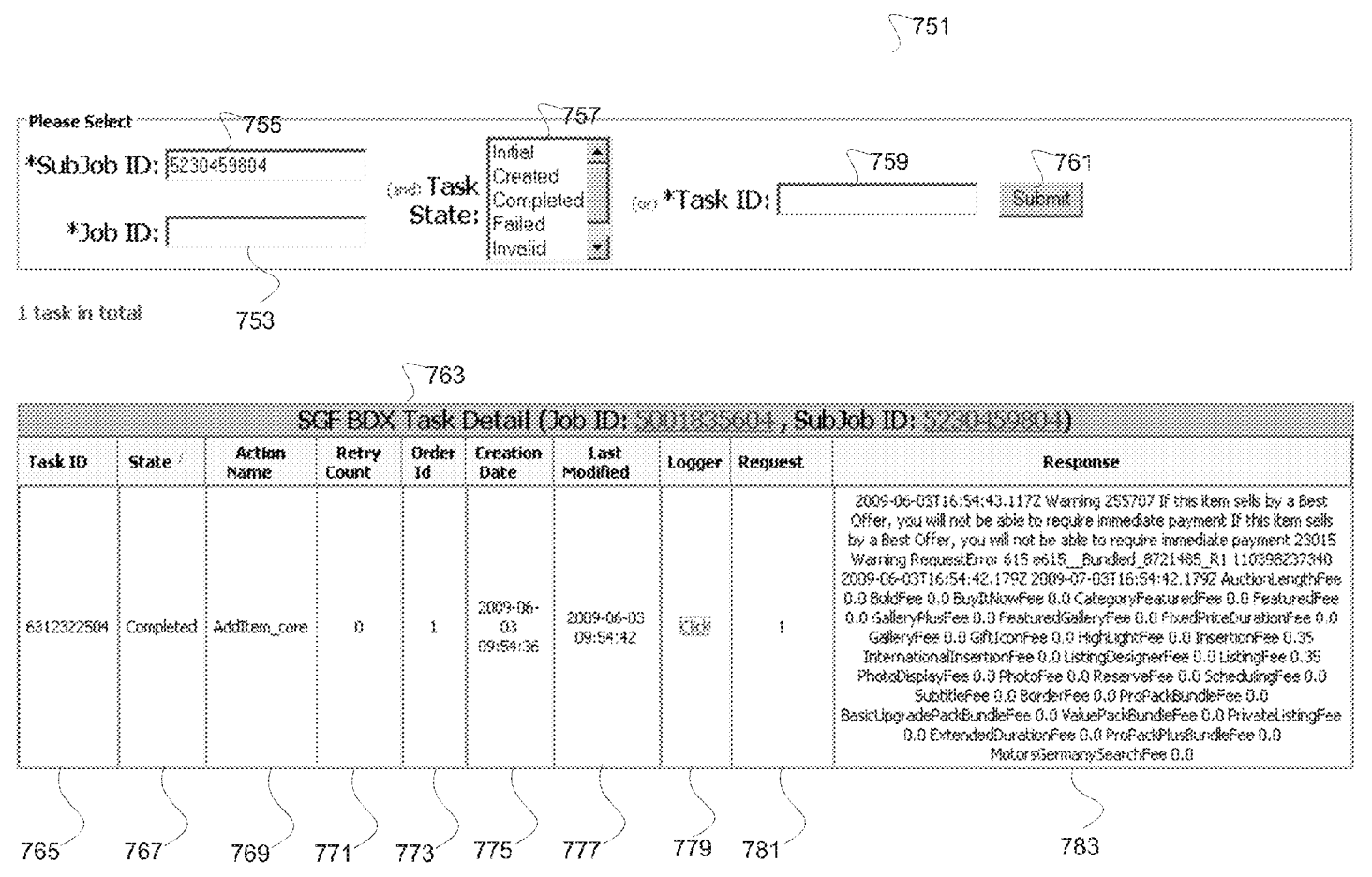

The display area 710 includes columns 711, 713, 715, 717, 719, 721, 723, 725, 727, 729 and 731. The column 711 may display a sub-job identifier for the sub-jobs 20 associated with the identified job 19. Selecting any of the sub-job 20 identifiers may display a user interface with tasks for the selected sub-job 20, as described further below. The column 713 may be used to display a sub-job state, as previously described. The column 715 may display a resource name. The column 717 may be used to display a date the sub-job 20 was created. The column 719 may be used to display a date and time the sub-job 20 was last modified. The column 721 may display a local total cost for resources. The column 723 may be used to display a remote total cost for resources. The column 725 may be used to display a local current cost for resources. The column 727 may be used to display a remote current cost for resources. The column 729 may be used to display an invocation global user identifier. The column 731 may be used to display user interface element that may be selected FIG. 17 is a diagram illustrating a user interface 751, according to an embodiment, to monitor tasks 39 associated with a sub-job 20. The user interface 751 may include user interface elements 753, 755, 757 and 759 in the form of search parameters to identify tasks 39 for display. The user interface element 753 may receive a scatter gather job identifier to identify a particular job 19. For example, a user operating the monitor machine 22 may enter the scatter gather job identifier to identify the particular job 19. The user interface element 755 may receive a scatter gather sub-job identifier to identify a particular sub-job 20. For example, a user operating the monitor machine 22 may enter the scatter gather sub-job identifier. In another embodiment the user interface element 753 may automatically receive a scatter gather job identifier, and the user interface element 755 may automatically receive a scatter gather sub-job identifier based on a selection of a scatter gather sub-job identifier that is previously selected from the column 711 on the user interface 701, as shown on FIG. 16. The user interface element 757 may be used to receive a task state. In one embodiment, the task states may include "initial," "created," "scheduled," "completed," "failed" and "invalid." The user interface element 759 may be used to receive a task identifier to identify a specific task 39. The user interface element 761 may be selected to submit the previously described search parameters. In response to the selection of user interface element 761, the monitor module 18 may receive the search parameters, identify the requested information for the tasks 39 in the statistical information 34 and display the requested information in a display area 763.

The display area 763 may include columns 765, 767, 769, 771, 773, 775, 777, 779, 781 and 783. The column 765 may be used to display a task identifier for a sub-job 20 associated with the identified job 19. The column 767 may be used to display a task state, as previously described. The column 769 may be used to display an action name (e.g., the name of an action made to a remote resource 41). The column 771 may be used to display a retry count representing the number of retries executed by the task 39. The column 773 may display an order identifier. For example, the tasks in a job 19 may be ordered 1 to 100 for the purpose of identifying the respective tasks. The column 775 may display a date the task was created. The column 777 may display a date and time the task 39 was last modified. The column 779 may display a user interface element that is selectable to display a user interface that includes information that describes a machine (e.g., processing node 26)/thread that worked on the task 39, as described further below. The column 781 may display a request and the column 783 may display a response. The request/response fields may be customized by a user of the application to store values related to the request and response.

Figure 18:

FIG. 18 is a diagram illustrating a user interface 780, according to an embodiment, to display a machine (e.g., processing node 26)/thread that worked on a task 39. The user interface 781 includes columns 782, 785, 787, 789, 791, 793, 795 and 797. The column 782 may display a process identifier that identifies the process that processed the task 39. The column 785 may display a scatter gather job identifier that identifies the job 19 associated with sub-job 20 that includes the task 39. The column 787 may display a machine identifier that identifies the processing node 26 that executed the task 39. The column 789 may display a thread identifier that identifies the thread that processed the task 39. The column 791 may display a date the thread was created. The column 793 may display a date and time the thread was last modified. The column 795 may display user interface element that may be selected to display logging that occurred for the task 39 as described more fully below. The column 797 may display a partition key. For example, a partition key may store a database table partition value. Records created during the same time period may be added according to the same partition value and a retention period defined. In one embodiment, expiration of the retention period may cause the records in the partition to be purged ensuring an efficient usage of data base storage.

Figure 19:
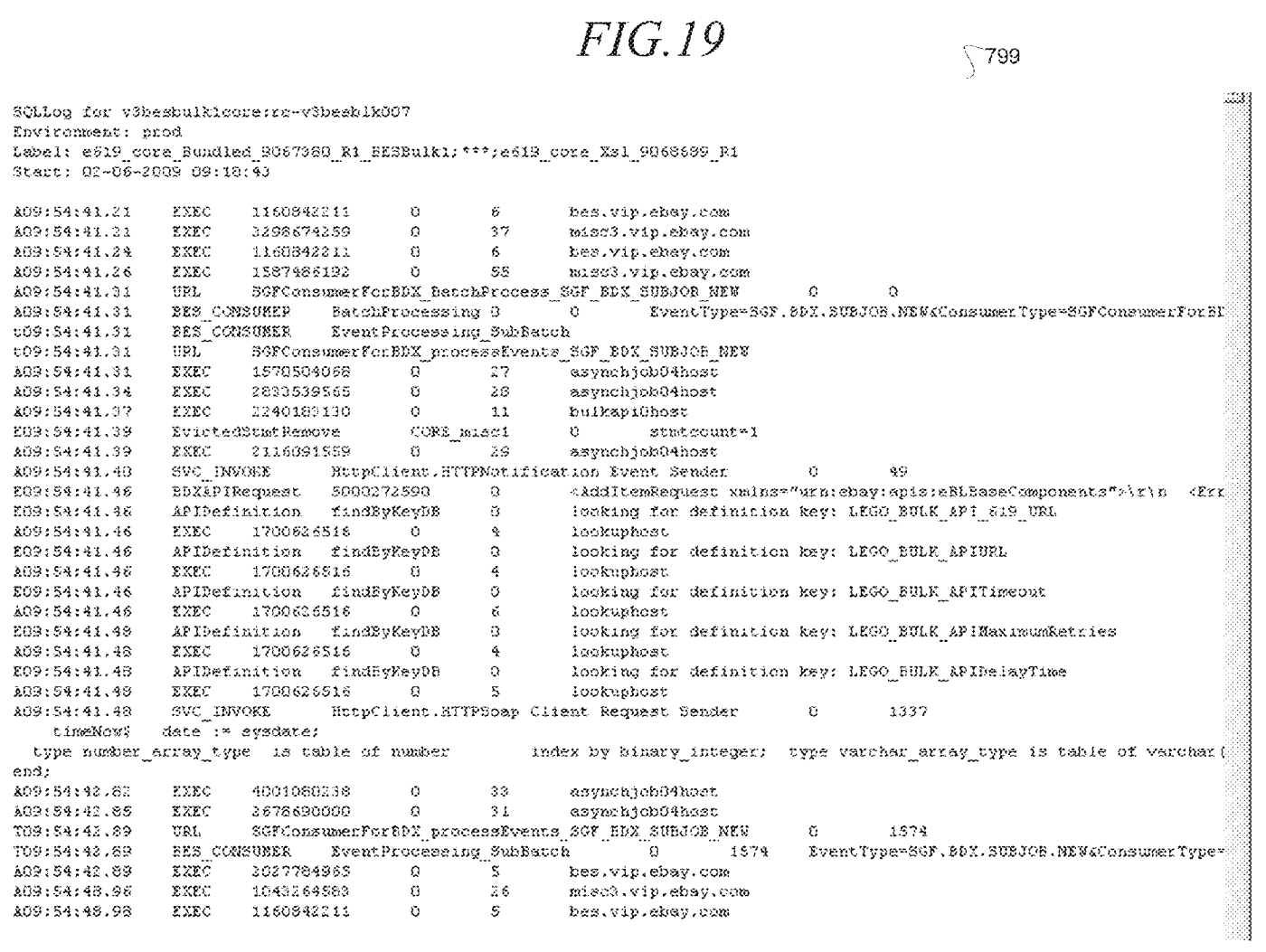

FIG. 19 is a diagram illustrating a user interface 799, according to an embodiment, to display a log of a machine (e.g., processing node 26)/thread that worked on a task 39. The user interface 799 may be displayed by selecting a user interface element from column 795 on the user interface 781 in FIG. 18. The user interface 799 is shown to include multiple log entries identified chronologically and including various information.

The above described user interfaces are illustrated to include user interface elements and columns for display. However, it will be appreciated by those skilled in the art that the user interfaces may also be embodied as a machine interface (e.g., Standard Generalized Markup Language—SGML) including machine interface elements, an audio interface including audio interface elements, a kinetic interface including kinetic interface elements, or some other type of interface using some other type of interface elements.

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage, tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, internet refers to a network of networks. These networks may use a variety of protocols for the exchange of data, including the aforementioned TCP/IP, and additionally asynchronous transfer mode (ATM), system network architecture SNA, SDI, or some other suitable protocol. These networks may be organized within a variety of topologies (e.g., a star topology) or structures.

Figure 20:
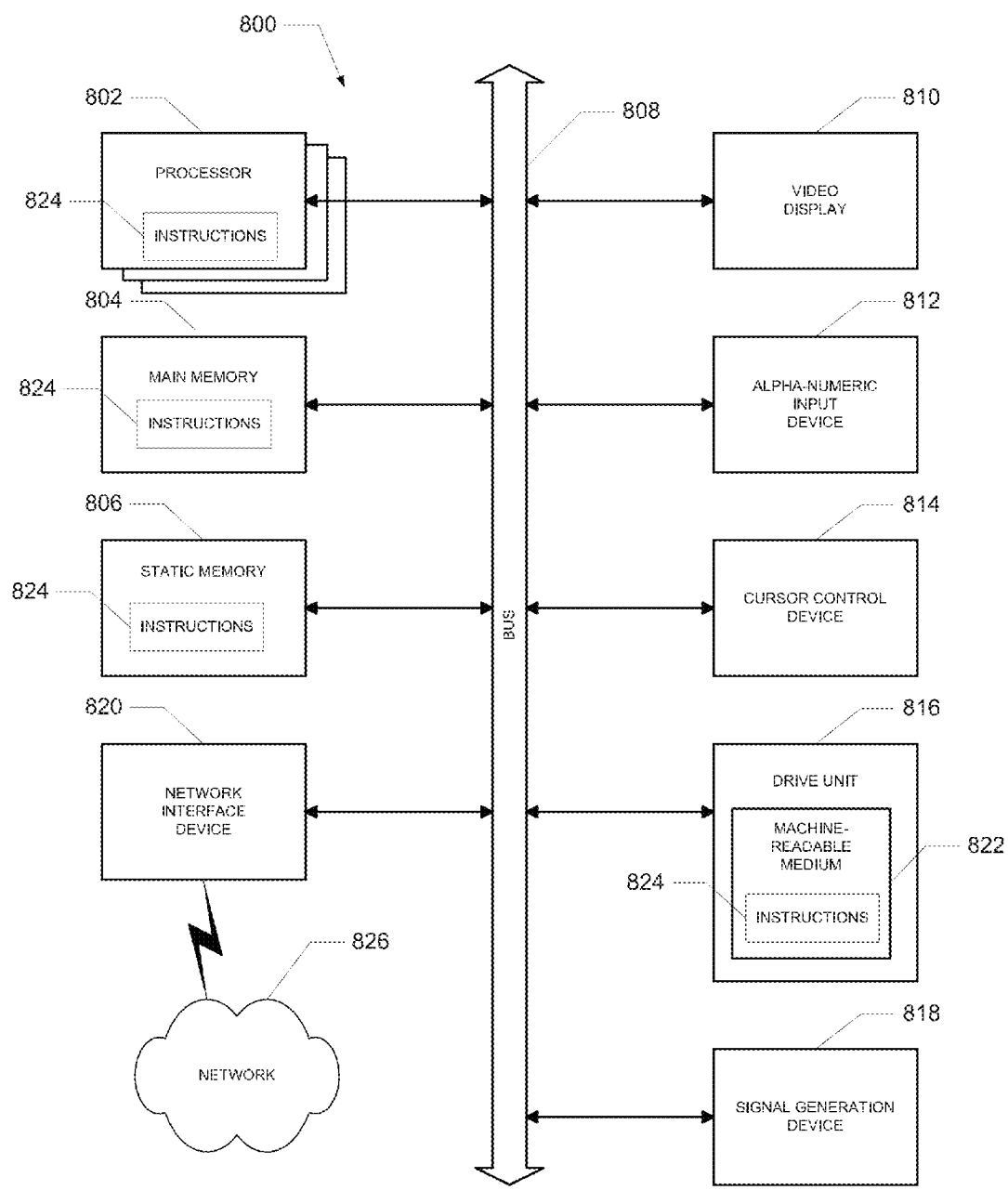
FIG. 20 shows a diagrammatic representation of a machine in the example form of a computer system, according to an example embodiment.

FIG. 20 shows a diagrammatic representation of a machine in the example form of a computer system 800 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes one or more processors 802 (e.g., a central processing unit (CPU), a graphics processing unit (GPU), or both), a main memory 804 and a static memory 806, which communicate with each other via a bus 808. The computer system 800 may further include a video display unit 810 (e.g. a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software) 824 embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, methods and systems to process a request received at an application program interface are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system comprising:
   at least one processor in communication with a non-transitory machine-readable medium storing instructions that, in response to execution by the at least one processor causes the system to perform operations that include processing a request received over a network, wherein the request is received from a client machine at an application program interface and the request comprises a job that indicates a set of tasks to be performed; and
   a peer-to-peer network of processing modules to perform operations comprising:
      in response to receipt of the job, generate a job event and process the job event for a predetermined amount of time, wherein processing of the job event includes:
         generate a plurality of sub jobs by dividing the job into one or more quantities of work, wherein each sub-job of the plurality of sub-jobs includes at least one task of the set of tasks;
         schedule the plurality of sub jobs for parallel processing based at least partially on an availability of resources that are utilized by the sub-jobs;
         parallel process the plurality of sub jobs to generate task results that are associated with the plurality of sub-jobs; and
         move one or more sub-jobs of the plurality of sub-jobs to a sub-jobs retry queue based on the availability of resources, wherein the moving of the one or more sub jobs to the sub jobs retry queue makes the one or more sub jobs visible to one or more processing modules of the peer-to-peer network to which the one or more sub-jobs were not previously visible;
      in response to expiration of the predetermined amount of time, move the job event to a job retry queue for an associated time out; and
      in response to expiration of the associated time out, retrieve the job event from the job retry queue for further processing.

2. The system of claim 1, further comprising a network-based marketplace, wherein:
   the job is utilized to communicate transaction data from the network-based marketplace to the client machine; and
   the peer-to-peer network of processing modules is further configured to perform operations comprising:
      communicate a first request for listing data to the client machine based on a first sub job of the plurality of jobs that is associated with listing data for a first plurality of listings;
      communicate a second request for listing data to the client machine based on a second sub job of the plurality of sub jobs that is associated with listing data for a second plurality of listings; and automatically add the first plurality of listings and the second plurality of listings to the network-based marketplace.

3. The system of claim 1, wherein:

the job is utilized to communicate transaction data from a network-based marketplace to the client machine; and the peer-to-peer network of processing modules is further configured to communicate the transaction data for a first plurality of transactions to the client machine and to communicate the transaction data for a second plurality of transactions to the client machine.

4. The system of claim 1, wherein the peer-to-peer network of processing modules is further configured to compute a priority of the job, wherein the scheduling of the plurality of sub jobs is based on the priority of the job.

5. The system of claim 1, wherein:

the peer-to-peer network of processing modules is further configured to limit a number of sub-jobs that are scheduled based on a peak load associated with a pool of database servers; and the peak load is caused by a utilization of the database servers by an entity other than the peer-to-peer network of processing modules.

6. The system of claim 1, wherein the one or more quantities of work are equal.

7. The system of claim 1, wherein:

the one or more sub-jobs are stored in the sub-job retry queue in response to processing of the one or more sub jobs being interrupted;

the sub job retry queue has an associated sub-job time-out; and the peer-to-peer network of processing modules is further configured to retrieve the one or more sub-jobs from the sub-job queue responsive to expiration of the sub-'ob time-out.

8. A method to process a request, the method comprising:

receiving a request over a network, wherein the request is received from a client machine at an application program interface and the request comprises a job that indicates a set of tasks to be performed;

in response to receipt of the job, generating a job event and processing the job event for a predetermined amount of time, wherein processing of the job event includes:

generating a plurality of sub-jobs by dividing the job into one or more quantities of work, wherein each sub-job of the plurality of sub-jobs includes at least one task of the set of tasks;

scheduling the plurality of sub-jobs for parallel processing by a peer-to-peer network based at least partially on an availability of resources that are utilized by the sub-jobs;

parallel processing the plurality of sub-jobs to generate task results that are associated with the plurality of sub-jobs; and moving one or more sub-jobs of the plurality of sub-jobs to a sub-job retry queue based on the availability of resources, wherein the moving of the one or more sub jobs to the sub job retry queue makes the one or more sub jobs visible to one or more processing modules of the peer-to-peer network to which the one or more sub jobs were not previously visible;

in response to expiration of the predetermined amount of time, moving the job event to a job retry queue for an associated time out; and in response to expiration of the associated time out, retrieving the job event from the job retry queue for further processing.

9. The method of claim 8, wherein the job is utilized to communicate transaction data from a network-based marketplace to the client machine, the method further comprising:

communicating a first request for listing data to the client machine based on a first sub-job of the plurality of jobs that is associated with listing data for a first plurality of listings;

communicating a second request for listing data to the client machine based on a second sub job of the plurality of sub-jobs that is associated with listing data for a second plurality of listings; and automatically adding the first plurality of listings and the second plurality of listings to the network-based marketplace.

10. The method of claim 8, wherein the job is utilized to communicate transaction data from a network-based marketplace to the client machine, the method further comprising:

communicating the transaction data for a first plurality of transactions to the client machine; and communicating the transaction data for a second plurality of transactions to the client machine.

11. The method of claim 8, further comprising computing a priority of the job, wherein the scheduling of the plurality of sub jobs is based on the priority of the job.

12. The method of claim 8, further comprising limiting a number of sub jobs that are scheduled based on a peak load associated with a pool of database servers, wherein the peak load is caused by a utilization of the database servers by an entity other than the peer-to-peer network of processing modules.

13. The method of claim 8, wherein the one or more quantities of work are equal.

14. The method of claim 8, wherein:

the one or more sub-jobs are stored in the sub-job retry queue in response to processing of the one or more sub jobs being interrupted;

the sub job retry queue has an associated sub job time-out; and the peer-to-peer network of processing modules is further configured to retrieve the one or more sub-jobs from the sub-job queue responsive to expiration of the sub-job time-out.

15. A non-transitory machine-readable medium storing instructions that, in response to being executed by one or more processors, cause performance of or control performance of operations comprising:

receiving a request over a network, wherein the request is received from a client machine at an application program interface and the request comprises a job that indicates a set of tasks to be performed;

in response to receipt of the job, generating a job event and processing the job event for a predetermined amount of time, wherein processing of the job event includes:

generating a plurality of sub-jobs by dividing the job into one or more quantities of work, wherein each sub-job of the plurality of sub-jobs includes at least one task of the set of tasks;

scheduling the plurality of sub jobs for parallel processing based at least partially on an availability of resources that are utilized by the sub-jobs;

parallel processing the plurality of sub-jobs to generate task results that are associated with the plurality of sub-jobs; and moving one or more sub-jobs of the plurality of sub-jobs to a sub-job retry queue based on the availability of resources, wherein the moving of the one or more sub jobs to the sub job retry queue makes the one or more sub jobs visible to one or more processing modules of a peer-to-peer network to which the one or more sub jobs were not previously visible;

in response to expiration of the predetermined amount of time, moving the job event to a job retry queue for an associated time out; and in response to expiration of the associated time out, retrieving the job event from the job retry queue for further processing.

16. The non-transitory machine-readable medium of claim 15, wherein:

the job is utilized to communicate transaction data from a network-based marketplace to the client machine; and the operations further comprise:

communicating a first request for listing data to the client machine based on a first sub job of the plurality of jobs that is associated with listing data for a first plurality of listings;

communicating a second request for listing data to the client machine based on a second sub job of the plurality of sub jobs that is associated with listing data for a second plurality of listings; and automatically adding the first plurality of listings and the second plurality of listings to the network-based marketplace.

17. The non-transitory machine-readable medium of claim 15, wherein:

the operations further comprise computing a priority of the job; and the scheduling of the plurality of sub jobs is based on the priority of the job.

18. The non-transitory machine-readable medium of claim 15, wherein:

the operations further comprise limiting a number of sub jobs that are scheduled based on a peak load associated with a pool of database servers; and the peak load is caused by a utilization of the database servers by an entity other than the peer-to-peer network of processing modules.

19. The non-transitory machine-readable medium of claim 15, wherein the one or more quantities of work are equal.

20. The non-transitory machine-readable medium of claim 15, wherein:

the one or more sub jobs are stored in the sub job retry queue in response to processing of the one or more sub jobs being interrupted;

the sub job retry queue has an associated sub-job time-out; and the peer-to-peer network of processing modules is further configured to retrieve the one or more sub-jobs from the sub-job queue responsive to expiration of the sub-job time-out.

* * * * *